(12) United States Patent
Morita et al.

(10) Patent No.: US 11,816,059 B2
(45) Date of Patent: Nov. 14, 2023

(54) TRANSMISSION DEVICE, TRANSMISSION METHOD, RECEIVING DEVICE, AND RECEIVING METHOD FOR PERFORMING SIGNAL TRANSMISSION BETWEEN A PLURALITY OF DAISY CHAINED DEVICES

(71) Applicant: SONY CORPORATION, Tokyo (JP)

(72) Inventors: Hiroshi Morita, Tokyo (JP); Kazuaki Toba, Tokyo (JP); Kazuo Yamamoto, Tokyo (JP); Masanari Yamamoto, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/058,814

(22) PCT Filed: May 24, 2019

(86) PCT No.: PCT/JP2019/020749
§ 371 (c)(1),
(2) Date: Nov. 25, 2020

(87) PCT Pub. No.: WO2019/235268
PCT Pub. Date: Dec. 12, 2019

(65) Prior Publication Data
US 2021/0209053 A1    Jul. 8, 2021

(30) Foreign Application Priority Data

Jun. 4, 2018 (JP) .................................. 2018-107296

(51) Int. Cl.
*G06F 13/42* (2006.01)
*G06F 13/40* (2006.01)
(Continued)

(52) U.S. Cl.
CPC ...... *G06F 13/4247* (2013.01); *G06F 13/4004* (2013.01); *G06F 13/4072* (2013.01); *H04L 5/04* (2013.01); *H04L 25/4917* (2013.01)

(58) Field of Classification Search
CPC ............. G06F 13/4004; G06F 13/4247; G06F 13/4072; H04L 5/04; H04L 25/4917
See application file for complete search history.

(56) References Cited

U.S. PATENT DOCUMENTS

2003/0011426 A1* 1/2003 Casper ................ H03F 3/45672
327/307
2005/0262363 A1 11/2005 Claseman
(Continued)

FOREIGN PATENT DOCUMENTS

CN  102232296 A  11/2011
EP  2355506 A1  8/2011
(Continued)

OTHER PUBLICATIONS

International Search Report and Written Opinion of PCT Application No. PCT/JP2019/020749, dated Jun. 25, 2019, 13 pages of ISRWO.

*Primary Examiner* — Phong H Dang
(74) *Attorney, Agent, or Firm* — CHIP LAW GROUP

(57) ABSTRACT

To enable preferable signal transmission between a plurality of daisy-chained devices at low cost. A transmission device generates a plurality of signals having different voltage levels and outputs the signals to a communication line at different timings. For example, the plurality of signals having different voltage levels is generated by a plurality of drivers or one driver. A receiving side can immediately determine whether or not it is information to be passed to the subsequent stage on the basis of only a difference in voltage level without logically analyzing contents of a signal, and (Continued)

cost of components such as a memory, verification cost, or the like are unnecessary so that the cost can be reduced.

9 Claims, 15 Drawing Sheets

(51) Int. Cl.
*H04L 5/04* (2006.01)
*H04L 25/49* (2006.01)

(56) References Cited

U.S. PATENT DOCUMENTS

| | | | |
|---|---|---|---|
| 2007/0067547 A1* | 3/2007 | Jang | G06F 13/4072 |
| | | | 710/313 |
| 2008/0144647 A1 | 6/2008 | Lyle | |
| 2012/0044985 A1 | 2/2012 | Tao et al. | |
| 2014/0013012 A1* | 1/2014 | Terlizzi | G06F 13/38 |
| | | | 710/15 |
| 2015/0049835 A1* | 2/2015 | Shibata | H04L 25/4919 |
| | | | 375/287 |
| 2016/0065187 A1* | 3/2016 | Krishnamoorthy | |
| | | | H03K 19/0027 |
| | | | 327/294 |
| 2016/0079747 A1* | 3/2016 | Srivastava | G06F 1/26 |
| | | | 361/84 |
| 2016/0342492 A1* | 11/2016 | Chen | G06F 13/4282 |
| 2017/0220088 A1* | 8/2017 | Tan | G06F 13/4022 |
| 2018/0278461 A1* | 9/2018 | Hollis | G11C 11/5642 |

FOREIGN PATENT DOCUMENTS

| | | |
|---|---|---|
| JP | 05-227250 A | 9/1993 |
| JP | 2002-101075 A | 4/2002 |
| JP | 2009-213121 A | 9/2009 |
| JP | 2017-135711 A | 8/2017 |
| KR | 10-2011-0091852 A | 8/2011 |
| WO | 2010/064540 A1 | 6/2010 |

* cited by examiner

TRANSMISSION DEVICE, TRANSMISSION METHOD, RECEIVING DEVICE, AND RECEIVING METHOD FOR PERFORMING SIGNAL TRANSMISSION BETWEEN A PLURALITY OF DAISY CHAINED DEVICES

CROSS REFERENCE TO RELATED APPLICATIONS

This application is a U.S. National Phase of International Patent Application No. PCT/JP2019/020749 filed on May 24, 2019, which claims priority benefit of Japanese Patent Application No. JP 2018-107296 filed in the Japan Patent Office on Jun. 4, 2018. Each of the above-referenced applications is hereby incorporated herein by reference in its entirety.

TECHNICAL FIELD

The present technology relates to a transmission device, a transmission method, a receiving device, and a receiving method, and particularly to a transmission device, a transmission method, a receiving device, and a receiving method for performing signal transmission between a plurality of daisy chained devices.

BACKGROUND ART

For example, Patent Document 1 discloses a technology of transmitting the same information to all nodes from a master in a daisy-chained multi-node network, and, by a slave side, transmitting and receiving information on the basis of a slave address assigned to the slave side, as a technology for multi-node communication of daisy-chained multi-devices.

In such multi-node communication of daisy-chained multi-devices, in a case of a system in which communication information with a preceding stage is not desired to be transmitted to a succeeding stage, a function of storing data in a memory and determining whether to transmit the data to the succeeding stage is required for an intermediate node, which results extra cost of components such as a memory, verification cost, and the like.

CITATION LIST

Patent Document

Patent Document 1: Japanese Patent Application Laid-Open No. 2017-135711

SUMMARY OF THE INVENTION

Problems to be Solved by the Invention

An object of the present technology is to enable preferable signal transmission between a plurality of daisy-chained devices at low cost.

Solutions to Problems

A concept of the present technology is
a transmission device including:
a signal generation unit that generates a plurality of signals having different voltage levels; and
a signal transmission unit that outputs the plurality of signals having different voltage levels to a communication line at different timings.

In the present technology, the signal generation unit generates the plurality of signals having different voltage levels. For example, the signal generation unit may be configured to generate the plurality of signals having different voltage levels by a plurality of drivers. Furthermore, for example, the signal generation unit may be configured to generate the plurality of signals having different voltage levels by one driver. Furthermore, for example, the signal generation unit may be configured to generate the plurality of signals having different voltage levels by current driving. The signal transmission unit outputs the plurality of signals having different voltage levels to the communication line at different timings.

As described above, in the present technology, a plurality of signals having different voltage levels is output to the communication line at different timings. Therefore, a receiving side can immediately determine whether or not it is information to be passed to the subsequent stage on the basis of only a difference in voltage level without logically analyzing contents of a signal, and cost of components such as a memory, verification cost, or the like are not necessary so that the cost can be reduced.

Note that the present technology may further include, for example, a determination unit that determines whether or not the communication line is connected to a receiving device corresponding to a plurality of signals having different voltage levels. In this case, for example, the determination unit may be configured to make determination on the basis of the voltage level of the communication line when a predetermined current is drawn from the communication line. Furthermore, in this case, for example, the determination unit may be configured to make determination on the basis of the voltage level of a power supply line when a switch inserted in the power supply line is opened. By including the determination unit as described above, it is possible to prevent malfunction on the receiving side.

Furthermore, in the present technology, for example. The present technology may further include a signal receiving unit that receives the plurality of signals having different voltage levels from the communication line at different timings. In this case, for example, the signal receiving unit may be configured to transmit a part of the plurality of signals having different voltage levels to the subsequent stage via the communication line. By including the signal receiving unit as described above, it is possible to receive the plurality of signals having different voltage levels transmitted through the communication line.

Furthermore, another concept of the present technology is
a receiving device including:
a signal receiving unit that receives a plurality of signals having different voltage levels from a communication line at different timings.

In the present technology, the signal receiving unit receives the plurality of signals having different voltage levels from the communication line at different timings. For example, the signal receiving unit may include a comparator having a threshold corresponding to the plurality of signals having different voltage levels. Furthermore, for example, the signal receiving unit may be configured to transmit a part of the plurality of signals having different voltage levels to a subsequent stage via the communication line. In this case, for example, a voltage level conversion unit that converts a voltage level of a signal transmitted to the subsequent stage to another voltage level may be further provided.

As described above, in the present technology, a plurality of signals having different voltage levels is received from the communication line at different timings. Therefore, it is possible to immediately determine whether or not it is information to be passed to the subsequent stage on the basis of only a difference in voltage level without logically analyzing contents of a signal, and cost of components such as a memory, verification cost, or the like are not necessary so that the cost can be reduced.

Effects of the Invention

According to the present technology, signal transmission can be preferably performed between a plurality of daisy-chained devices at low cost. Note that the effects described in this specification are merely examples, and is not limited thereto, and may have additional effects.

MODE FOR CARRYING OUT THE INVENTION

Hereinafter, modes (hereinafter referred to as "embodiments") for carrying out the invention will be described. Note that the description will be given in the following order.

1. Embodiments
2. Modification

1. EMBODIMENTS

Configuration of Transmission System

First Embodiment

Figure 1:
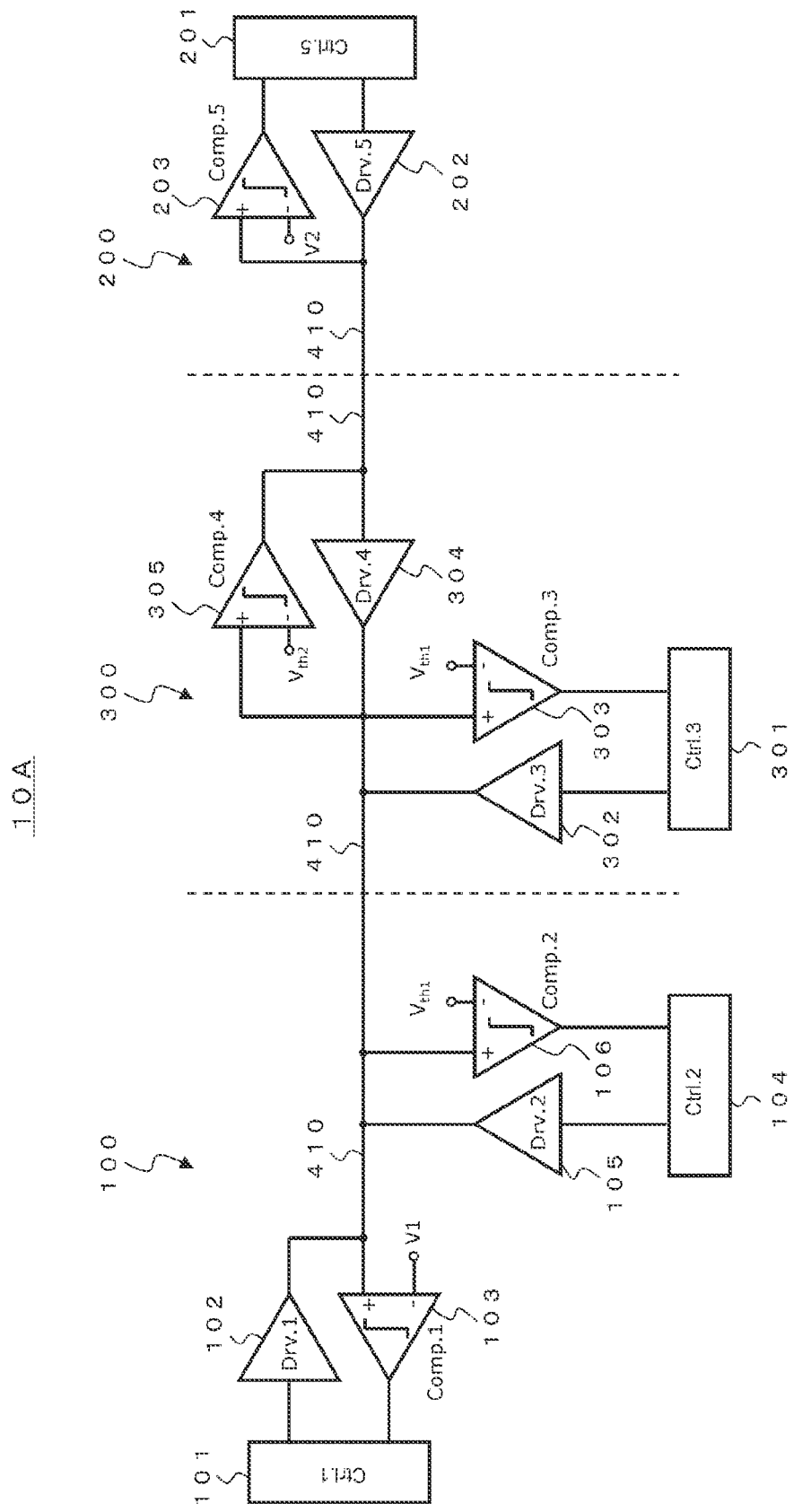
FIG. 1 is a diagram showing a configuration example of a transmission system as a first embodiment.

FIG. 1 shows a configuration example of a transmission system 10A as a first embodiment. The transmission system 10A is, for example, an HDMI transmission system using HDMI as a digital interface, but is not limited to this. Note that "HDMI" is a registered trademark.

This transmission system 10A includes a source device 100, a sink device 200, and a cable 300 connecting these. This transmission system 10A is configured such that the source device 100 and the sink device 200, and the source device 100 and the cable 300 can independently communicate with each other, and transmitting and receiving of signals between the source device 100 and the cable 300 is not transmitted to the sink device 200.

The voltage level of the signal output from the source device 100 to the communication line is changed between when the source device 100 and the sink device 200 communicate with each other and when the source device 100 and the cable 300 communicate with each other, so that independent communication is enabled. The cable 300 is configured such that, at the voltage level at which the source device 100 and the sink device 200 communicate with each other, the signal from the source device 100 is transmitted as it is to the sink device 200, and at the voltage level at which the source device 100 and the cable 300 communicate with each other, the signal from the source device 100 is received but is not transmitted to the sink device 200. The term "as it is" here includes signals that are logically the same, but electrically different, such as having different voltage levels.

For example, when the cable is an HDMI cable, a DDC line, a utility line, or the like can be used as the communication line, but the communication line is not limited to these.

The source device 100 is a controller (Ctrl.1) 101, a driver (Drv.1) 102, a comparator (Comp.1) 103, a controller (Ctrl.2) 104, a driver (Drv.2) 105, and a comparator (Comp.2) 106. The drivers 102, 105 form a signal generation unit and a signal transmission unit. The comparators 103, 106 form a signal receiving unit.

The controller 101 transmits transmission data to the driver 102 and receives reception data from the comparator 103. The driver 102 generates a signal having a voltage level of 0 to 2.5 V corresponding to the transmission data transmitted from the controller 101, and outputs the signal to the communication line 410. In this case, for example, the logic "0" of the transmission data is 0 V and the logic "1" is 2.5 V. A signal is input from the communication line 410 to a positive input terminal of the comparator 103, and a threshold V1 is given to a negative input terminal of the comparator 103. Here, the threshold V1 is set to a value between 0 V and 2.5 V, for example, 1.25 V. The comparator 103 outputs "0" when the signal level is lower than the threshold V1, and outputs "1" when the signal level is equal to or greater than the threshold V1.

The controller 104 transmits transmission data to the driver 105 and receives reception data from the comparator 106. The driver 105 generates a signal having a voltage level of 2.5 to 5 V corresponding to the transmission data transmitted from the controller 104, and outputs the signal to the communication line 410. In this case, for example, the logic "0" of the transmission data is 2.5 V and the logic "1" is 5 V. A signal is input from the communication line 410 to a positive input terminal of the comparator 106, and a threshold Vth1 is given to a negative input terminal of the comparator 106. Here, the threshold Vth1 is set to a value between 2.5 V and 5 V, for example, 3.25 V. The comparator 106 outputs "0" when the signal level is lower than the threshold Vth1, and outputs "1" when the signal level is equal to or greater than the threshold Vth1.

The cable 300 includes a controller (Ctrl.3) 301, a driver (Drv.3) 302, a comparator (Comp.3) 303, a driver (Drv.4) 304, and a comparator (Comp.4) 305. The drivers 302, 304 form the signal generation unit and the signal transmission unit. The comparators 303, 305 form the signal receiving unit.

The controller 301 transmits transmission data to the driver 302 and receives reception data from the comparator 303. The driver 302 generates a signal having a voltage level of 2.5 to 5 V corresponding to the transmission data transmitted from the controller 301, and outputs the signal to the communication line 410. In this case, for example, the logic "0" of the transmission data is 2.5 V and the logic "1" is 5 V. A signal is input from the communication line 410 to a positive input terminal of the comparator 303, and the threshold Vth1 is given to a negative input terminal of the comparator 303. The comparator 303 outputs "0" when the signal level is lower than the threshold Vth1, and outputs "1" when the signal level is equal to or greater than the threshold Vth1.

The driver 304 and the comparator 305 are inserted in the communication line 410 while being connected in parallel. The driver 304 receives a signal from the communication line 410 on the sink device 200 side and outputs a signal whose voltage level is converted from 0 to 5 V to 0 to 2.5 V to the communication line 410 on the source device 100 side.

A signal is input from the communication line 410 on the source device 100 side to a positive input terminal of the comparator 305, and a threshold Vth2 is given to a negative input terminal of the comparator 305. Here, the threshold Vth2 is set to a value between 0 V and 2.5 V, for example, 1.25 V. The comparator 305 outputs 0 V when the signal level is lower than the threshold Vth2, and outputs 5 V when the signal level is equal to or greater than the threshold Vth2. That is, when the voltage level of the signal on the communication line 410 on the sink device 200 side is 0 to 2.5 V, the comparator 305 converts the signal into a signal having a voltage level of 0 to 5 V so that the legacy sink device 200 also can receive the signal, and outputs the converted signal to the communication line 410 on the sink device 200 side. The comparator 305 is provided so as to transmit a signal having a voltage level of 0 to 2.5 V to the sink device 200 as it is, but cut off a signal having a voltage level of 2.5 to 5 V such that the signal is not transmitted to the sink device 200.

The sink device 200 is a legacy sink device. The sink device 200 includes a controller (Ctrl.5) 201, a driver (Drv.5) 202, and a comparator (Comp.5) 203. The driver 202 forms the signal generation unit and the signal transmission unit. The comparator 203 forms the signal receiving unit.

The controller 201 transmits transmission data to the driver 202 and receives reception data from the comparator 203. The driver 202 generates a signal having a voltage level of 0 to 5 V corresponding to the transmission data transmitted from the controller 201, and outputs the signal to the communication line 410. In this case, for example, the logic "0" of the transmission data is 0 V and the logic "1" is 5 V. A signal is input from the communication line 410 to a positive input terminal of the comparator 203, and a threshold V2 is given to a negative input terminal of the comparator 203. Here, the threshold V2 is set to a value between 0 V and 5 V, for example, 2.5 V. The comparator 203 outputs "0" when the signal level is lower than the threshold V2, and outputs "1" when the signal level is equal to or greater than the threshold V1.

The threshold V1 of the comparator 103 and the threshold Vth2 of the comparator 305 are, for example, 1.25 V, and therefore, these comparators 103, 305 can receive (detect) a signal having a voltage level of 0 to 2.5 V, but cannot receive (detect) a signal having a voltage level of 2.5 to 5 V. Furthermore, the threshold Vth1 of the comparators 106, 303 is, for example, 3.75 V, and therefore, these comparators 106, 303 can receive (detect) a signal having a voltage level of 2.5 to 5 V, but cannot receive (detect) a signal having a voltage level of 0 to 2.5 V.

In the transmission system 10A of FIG. 1, the driver 102, the comparator 103, the driver 304, the comparator 305, the driver 202, and the comparator 203 are circuits for the source device 100 and the sink device 200 to transmit and receive information to and from each other.

A case where data is transmitted from the source device 100 to the sink device 200 will be described. In this case, transmission data is transmitted from the controller 101 of the source device 100 to the driver 102. The driver 102 generates a signal having a voltage level of 0 to 2.5 V corresponding to the transmission data and outputs the signal to the communication line 410. The signal having the voltage level of 0 to 2.5 V is input to the positive input terminal of the comparator 305 of the cable 300 from the communication line 410.

In the comparator 305, the threshold Vth2 is, for example, 1.25 V, so that the signal having the voltage level of 0 to 2.5 V is received (detected), converted into a signal having the voltage level of 0 to 5 V, and output to the communication line 410. The signal having the voltage level of 0 to 5 V is input to the positive input terminal of the comparator 203 of the sink device 200 from the communication line 410. Since the threshold V2 is 2.5 V, in the comparator 203, a signal having a voltage level of 0 to 5 V is received (detected), and reception data that is the output data of the comparator 203 is transmitted to the controller 201.

Note that, in this case, in the cable 300, a signal having a voltage level of 0 to 2.5 V is input also to the positive input terminal of the comparator 303 from the communication line 410. In the comparator 303, the threshold Vth1 is, for example, 3.75 V, so that a signal having a voltage level of 0 to 2.5 V is not received (detected). That is, in this case, the output of the comparator 303 remains "0", and the controller 301 of the cable 300 cannot receive the data.

Next, a case where data is transmitted from the sink device 200 to the source device 100 will be described. In this case, transmission data is transmitted from the controller 201 of the sink device 200 to the driver 202. The driver 202 generates a signal having a voltage level of 0 to 5 V corresponding to the transmission data and outputs the signal to the communication line 410. The signal having the voltage level of 0 to 5 V is input to the driver 304 of the cable 300 from the communication line 410.

In this driver 304, a signal having a voltage level of 0 to 5 V is converted into a signal whose voltage level changes from 0 to 5 V to 0 to 2.5 V, and output to the communication line 410. The signal having the voltage level of 0 to 2.5 V is input to the positive input terminal of the comparator 103 of the source device 100 from the communication line 410.

In the comparator 103, the threshold V1 is, for example, 1.25 V, so that a signal having a voltage level of 0 to 2.5 V is received (detected), and reception data that is the output data of the comparator 103 is transmitted to the controller 101.

Note that, in this case, in the cable 300, a signal having a voltage level of 0 to 2.5 V is input also to the positive input terminal of the comparator 303 from the communication line 410. In the comparator 303, the threshold Vth1 is, for example, 3.75 V, so that a signal having a voltage level of 0 to 2.5 V is not received (detected). That is, in this case, the output of the comparator 303 remains "0", and the controller 301 of the cable 300 cannot receive the data.

Furthermore, in the transmission system 10A of FIG. 1, the driver 105, the comparator 106, the driver 302, and the comparator 303 are circuits for the source device 100 and the cable 300 to transmit and receive information to and from each other.

A case of transmitting data from the source device 100 to the cable 300 will be described. In this case, transmission data is transmitted from the controller 104 of the source device 100 to the driver 105. The driver 105 generates a signal having a voltage level of 2.5 to 5 V corresponding to the transmission data and outputs the signal to the communication line 410. The signal having the voltage level of 2.5 to 5 V is input from the communication line 410 to the positive input terminal of the comparator 303 of the cable 300. In the comparator 303, the threshold Vth1 is, for example, 3.75 V, so that a signal having a voltage level of 2.5 to 5 V is received (detected), and reception data that is the output data of the comparator 303 is transmitted to the controller 301.

Note that, in this case, in the cable 300, a signal having a voltage level of 2.5 to 5 V is input also to the positive input terminal of the comparator 305 from the communication line 410. In the comparator 305, the threshold Vth2 is, for example, 1.25 V, so that a signal having a voltage level of 2.5 to 5 V is not received (detected). That is, in this case, the output of the comparator 305 remains 5 V, and the signal is not transmitted to the sink device 200 side.

Next, a case of transmitting data from the cable 300 to the source device 100 will be described. In this case, transmission data is transmitted from the controller 301 of the cable 300 to the driver 302. The driver 302 generates a signal having a voltage level of 2.5 to 5 V corresponding to the transmission data and outputs the signal to the communication line 410. The signal having the voltage level of 2.5 to 5 V is input to the positive input terminal of the comparator 106 of the source device 100 from the communication line 410. In the comparator 106, the threshold Vth1 is, for example, 3.75 V, so that a signal having a voltage level of 2.5 to 5 V is received (detected), and reception data that is the output data of the comparator 106 is transmitted to the controller 104.

Note that, in this case, in the cable 300, a signal having a voltage level of 2.5 to 5 V is input also to the positive input terminal of the comparator 305 from the communication line 410. In the comparator 305, the threshold Vth2 is, for example, 1.25 V, so that a signal having a voltage level of 2.5 to 5 V is not received (detected). That is, in this case, the output of the comparator 305 remains 5 V, and the signal is not transmitted to the sink device 200 side.

Figure 2:
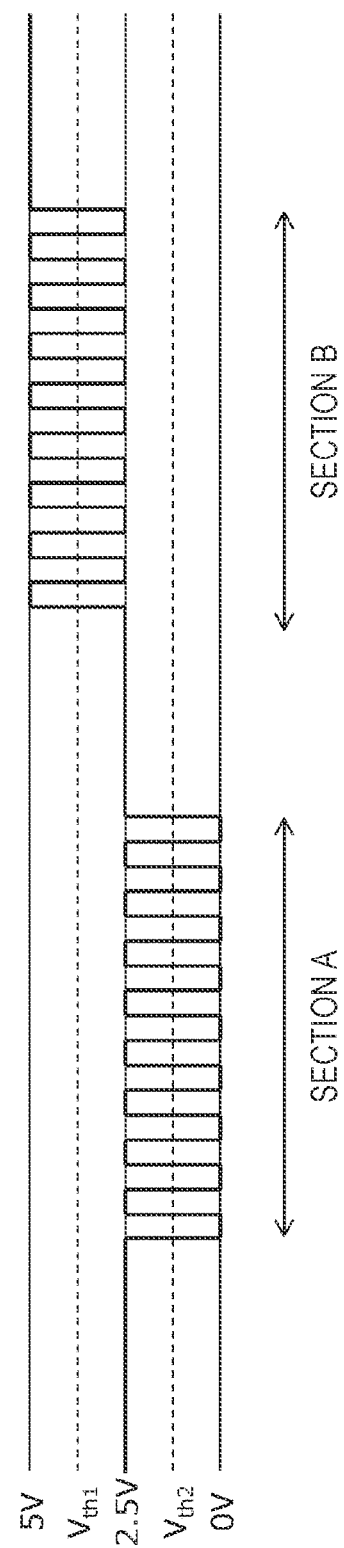
FIG. 2 is a diagram showing an example of a sequence of communication between a source device and a sink device and communication between a source device and a cable.

FIG. 2 shows an example of a sequence of communication between the source device 100 and the sink device 200 and communication between the source device 100 and the cable 300. A section A indicates a section in which the source device 100 and the sink device 200 communicate with each other with a signal having a voltage level of 0 to 2.5 V, and a section B indicates a section in which the source device 100 and the cable 300 communicate with each other with a signal having a voltage level of 2.5 to 5 V.

Here, since these pieces of communication are performed through the same communication line 410, the A section and the B section do not perform communication overlapping each other in terms of time, and communication is established only in a case where the timings of these pieces of communication are deviated. For example, in a case where the master is the source device 100, the source device 100 determines whether to communicate with the sink device 200 or the cable 300. Although detailed description is omitted, in this case, it is necessary to adjust the section A and the section B so as to be deviated from each other, and arbitration is required such that when one node declares communication, the other node does not transmit signals.

As described above, in the transmission system 10A shown in FIG. 1, the source device 100 and the sink device 200, and the source device 100 and the cable 300 can independently communicate with each other, and transmitting and receiving of signals between the source device 100 and the cable 300 is not transmitted to the sink device 200. In this case, without logically analyzing the contents of the signal, the cable 300 can immediately determine whether or not it is information to be passed to the sink device 200 of the subsequent stage on the basis of only the difference in the voltage level, and cost of components such as a memory, verification cost, or the like are not necessary and the cost can be reduced.

Note that, in the configuration of the transmission system 10A shown in FIG. 1, the source device 100 includes the controller 101 and the controller 104, but these may be configured as one controller.

Figure 3:
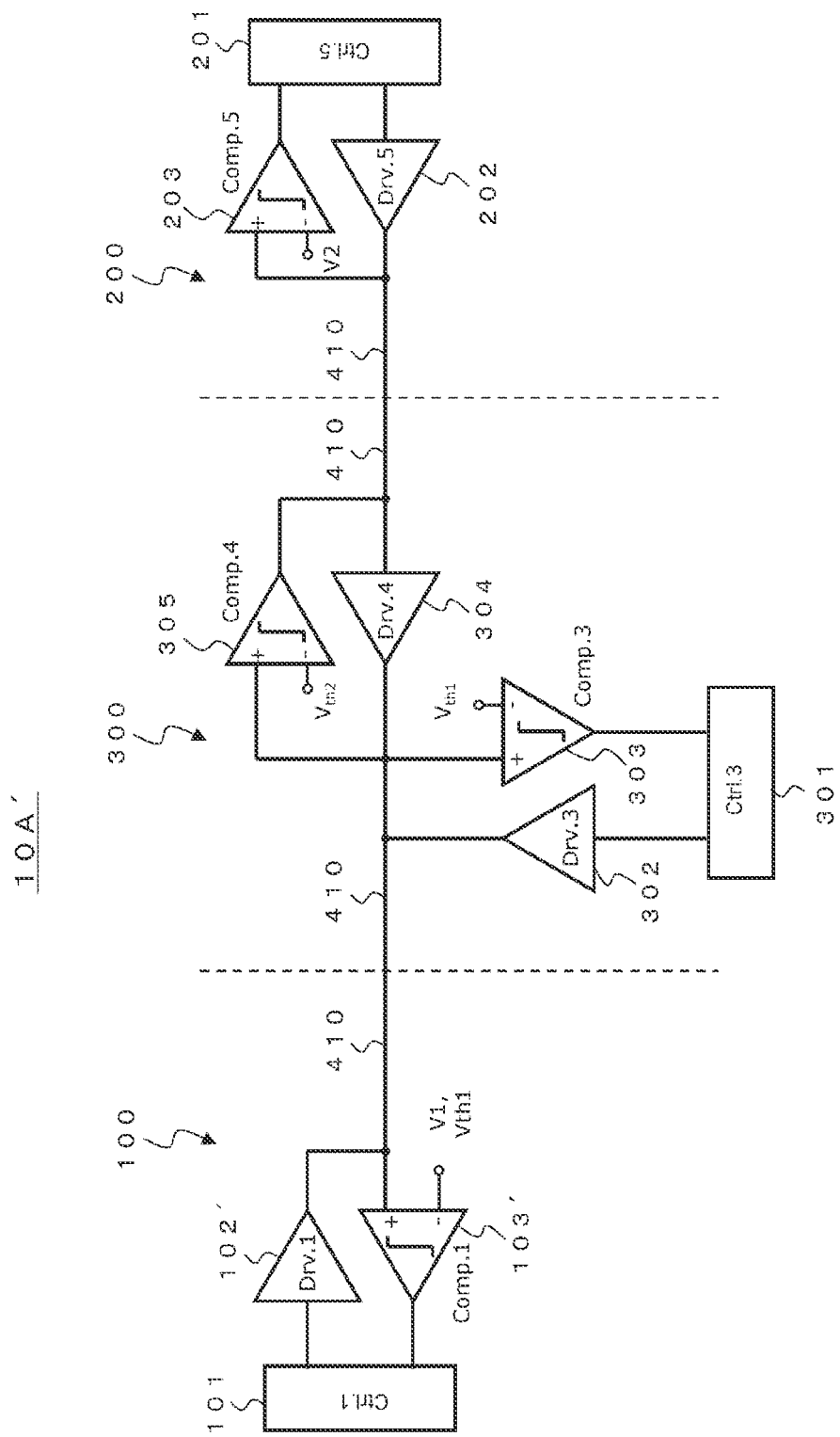
FIG. 3 is a diagram showing a configuration example of the transmission system obtained by modifying the transmission system of FIG. 1.

Furthermore, a case has been described in which, in the configuration of the transmission system 10A shown in FIG. 1, the source device 100 has a separate driver for generating and transmitting a signal having a voltage level of 0 to 2.5 V and a signal having a voltage level of 2.5 to 5 V, and has a separate comparator for receiving each signal. However, as in a transmission system 10A' shown in FIG. 3, a configuration in which one is used for each of them is conceivable. That is, the driver is provided with a driver 102', and the comparator is provided with a comparator 103' to which a threshold V1/Vth1 is given.

Second Embodiment

Figure 4:
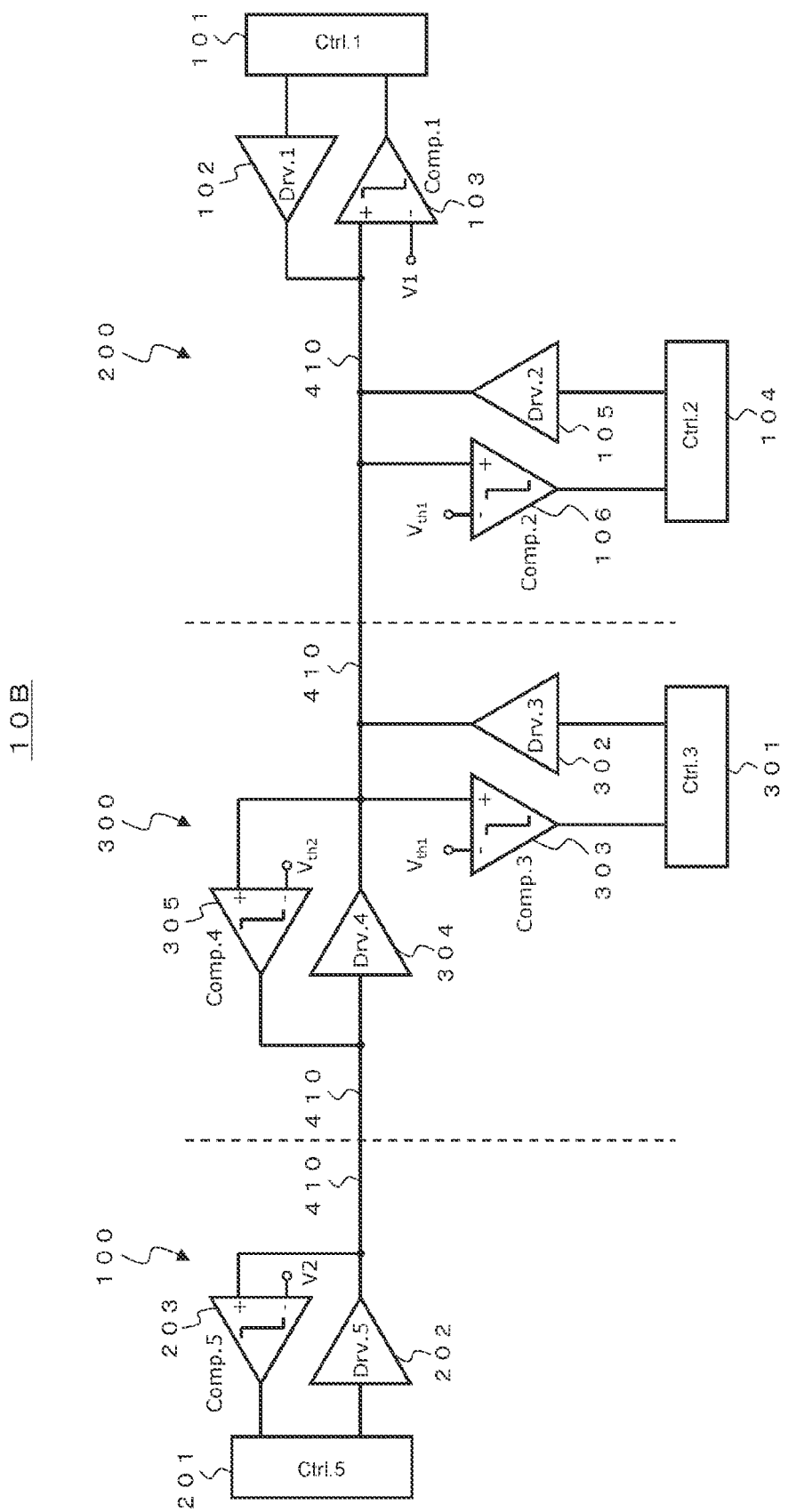
FIG. 4 is a diagram showing a configuration example of a transmission system as a second embodiment.

FIG. 4 shows a configuration example of a transmission system 10B as a second embodiment. In this FIG. 4, parts corresponding to those in FIG. 1 are designated by the same reference numerals, and detailed description thereof will be appropriately omitted. This transmission system 10B includes the source device 100, the sink device 200, and the cable 300 connecting these. This transmission system 10B is configured such that the sink device 200 and the source device 100, and the sink device 200 and the cable 300 can independently communicate with each other, and transmitting and receiving of signals between the sink device 200 and the cable 300 is not transmitted to the source device 100.

The voltage level of the signal output from the sink device 200 to the communication line is changed between when the sink device 200 and the source device 100 communicate and when the sink device 200 and the cable 300 communicate, so that independent communication is enabled. The cable 300 is configured such that, at the voltage level at which the sink device 200 and the source device 100 communicate with each other, the signal from the sink device 200 is directly transmitted to the source device 100, and at the voltage level at which the sink device 200 and the cable 300 communicate with each other, the signal from the sink device 200 is received but is not transmitted to the source device 100.

The sink device 200 includes the controller 101, the driver 102, the comparator 103, the controller 104, the driver 105, and the comparator 106. Although detailed description is omitted, this is similar to the configuration of the source device 100 in the transmission system 10A of FIG. 1.

The cable 300 includes the controller 301, the driver 302, the comparator 303, the driver 304, and the comparator 305. Although detailed description is omitted, this is similar to the configuration of the cable 300 in the transmission system 10A of FIG. 1. However, the connection direction of the cable 300 is opposite to that in the case of the transmission system 10A.

The source device 100 is a legacy source device. The source device 100 includes the controller 201, the driver 202, and the comparator 203. Although detailed description is omitted, this is similar to the configuration of the sink 200 in the transmission system 10A of FIG. 1.

Although detailed description is omitted, the communication operation between the sink device 200 and the source device 100 in the transmission system 10B shown in FIG. 4 is similar to the communication operation between the source device 100 and the sink device 200 in the transmission system 10A of FIG. 1. Furthermore, although detailed description is omitted, the communication operation between the sink device 200 and the cable 300 in the transmission system 10B shown in FIG. 4 is similar to the communication operation between the source device 100 and the cable 300 in the transmission system 10A of FIG. 1.

As described above, in the transmission system 10B shown in FIG. 4, the sink device 200 and the source device 100, and the sink device 200 and the cable 300 can independently communicate with each other, and transmitting and receiving of signals between the sink device 200 and the cable 300 is not transmitted to the source device 100. In this case, without logically analyzing the contents of the signal, the cable 300 can immediately determine whether or not it is information to be passed to the source device 100 of the subsequent stage on the basis of only the difference in the voltage level, and cost of components such as a memory, verification cost, or the like are not necessary and the cost can be reduced.

Third Embodiment

Figure 5:
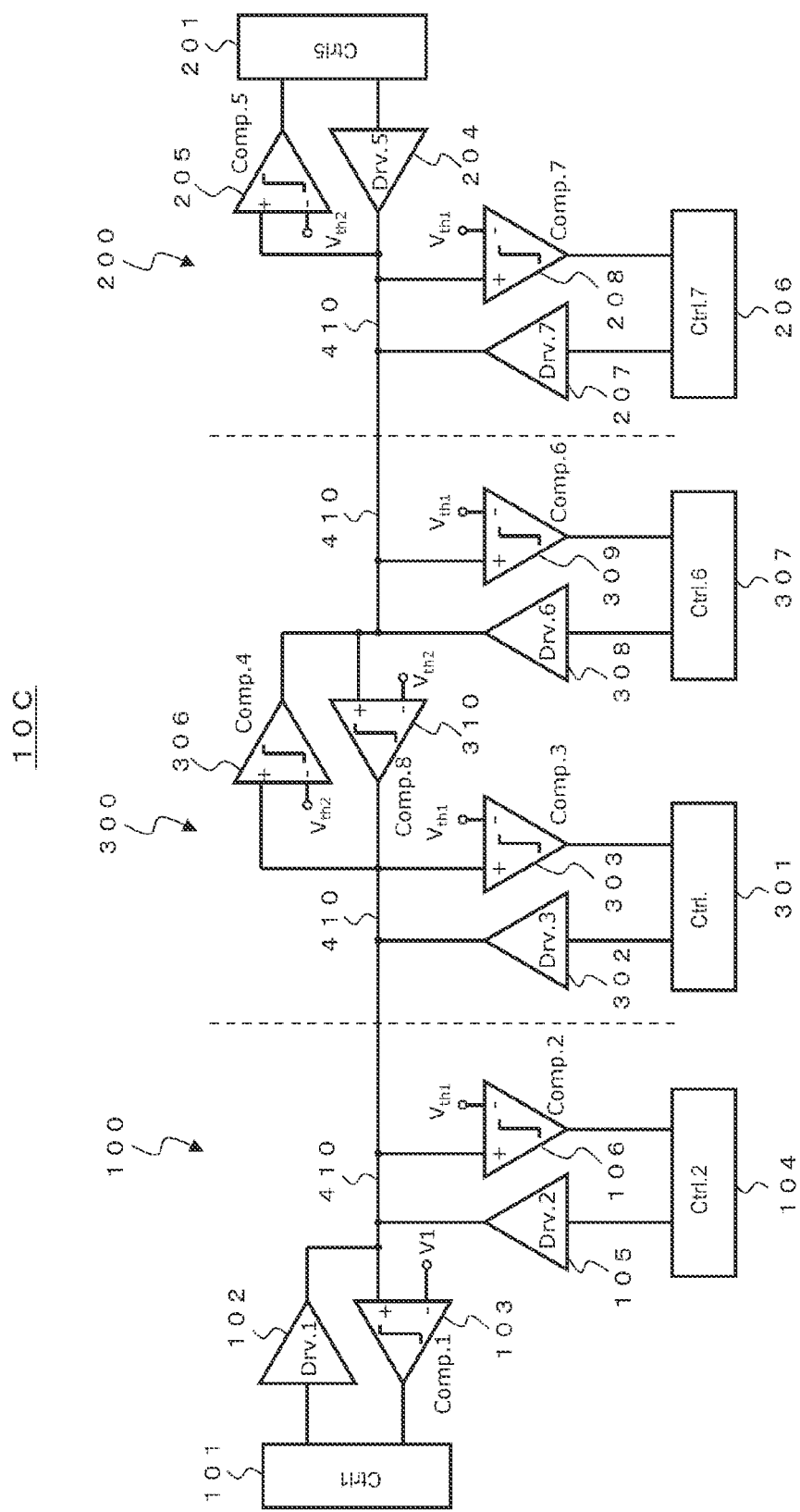
FIG. 5 is a diagram showing a configuration example of a transmission system as a third embodiment.

FIG. 5 shows a configuration example of a transmission system 10C as a third embodiment. In this FIG. 5, parts corresponding to those in FIG. 1 are designated by the same reference numerals, and detailed description thereof will be appropriately omitted. This transmission system 10C includes the source device 100, the sink device 200, and the cable 300 connecting these.

This transmission system 10C is configured such that the source device 100 and the sink device 200, the source device 100 and the cable 300, and the sink device 200 and the cable 300 can independently communicate with each other, transmitting and receiving of signals between the source device 100 and the cable 300 is not transmitted to the sink device 200, and transmitting and receiving of signals between the sink device 200 and the cable 300 is not transmitted to the source device 100.

The voltage level of the signal output from the source device 100 to the communication line is changed between when the source device 100 and the sink device 200 communicate with each other and when the source device 100 and the cable 300 communicate with each other, so that independent communication is enabled. Furthermore, as similar to that, the voltage level of the signal output from the sink device 200 to the communication line is changed between when the sink device 200 and the source device 100 communicate and when the sink device 200 and the cable 300 communicate, so that independent communication is enabled.

The cable 300 is configured such that, at the voltage level at which the source device 100 and the sink device 200 communicate with each other, the signal from the source device 100 is transmitted as it is to the sink device 200, and at the voltage level at which the source device 100 and the cable 300 communicate with each other, the signal from the source device 100 is received but is not transmitted to the sink device 200. Furthermore, the cable 300 is configured such that, at the voltage level at which the sink device 200 and the source device 100 communicate with each other, the signal from the sink device 200 is directly transmitted to the source device 100, and at the voltage level at which the sink device 200 and the cable 300 communicate with each other, the signal from the sink device 200 is received but is not transmitted to the source device 100.

The source device 100 includes the controller 101, the driver 102, the comparator 103, the controller 104, the driver 105, and the comparator 106. Although detailed description is omitted, this is similar to the configuration of the source device 100 in the transmission system 10A of FIG. 1.

The cable 300 includes a controller 301, a driver 302, a comparator 303, a comparator (Comp.4)) 306, a controller (Ctrl.6) 307, a driver (Drv.6) 308, a comparator (Comp.6) 309, and a comparator (Comp.8) 310. Although detailed descriptions are omitted, the controller 301, the driver 302, and the comparator 303 are similar to the controller 301, the driver 302, and the comparator 303 in the transmission system 10A of FIG. 1.

The controller 307 transmits transmission data to the driver 308 and receives reception data from the comparator 309. The driver 308 generates a signal having a voltage level of 2.5 to 5 V corresponding to the transmission data transmitted from the controller 307, and outputs the signal to the communication line 410. In this case, for example, the logic "0" of the transmission data is 2.5 V and the logic "1" is 5 V. A signal is input from the communication line 410 to a positive input terminal of the comparator 309, and a threshold Vth1 is given to a negative input terminal of the comparator 309. The comparator 309 outputs "0" when the signal level is lower than the threshold Vth1, and outputs "1" when the signal level is equal to or greater than the threshold Vth1.

The comparator 306 and the comparator 310 are inserted to the communication line 410 while being connected in parallel. A signal is input from the communication line 410 on the source device 100 side to a positive input terminal of the comparator 306, and a threshold Vth2 is given to a negative input terminal of the comparator 306. The comparator 306 outputs 0 V when the signal level is lower than the threshold Vth2, and outputs 2.5 V when the signal level is equal to or greater than the threshold Vth2. The comparator 306 is provided so as to transmit a signal having a voltage level of 0 to 2.5 V to the sink device 200 as it is, but cut off a signal having a voltage level of 2.5 to 5 V such that the signal is not transmitted to the sink device 200.

Furthermore, a signal is input from the communication line 410 on the sink device 200 side to a positive input terminal of the comparator 310, and a threshold Vth2 is given to a negative input terminal of the comparator 310. The comparator 310 outputs 0 V when the signal level is lower than the threshold Vth2, and outputs 2.5 V when the signal level is equal to or greater than the threshold Vth2. The comparator 310 is provided so as to transmit a signal having a voltage level of 0 to 2.5 V to the source device 100 as it is, but cut off a signal having a voltage level of 2.5 to 5 V such that the signal is not transmitted to the source device 100.

The sink device 200 includes a controller (Ctrl.5) 201, a driver (Drv.5) 204, a comparator (Comp.5) 205, a controller (Ctrl.7) 206, a driver (Drv.7) 207, and a comparator (Comp.7) 208. The drivers 204, 207 form the signal generation unit and the signal transmission unit. The comparators 205, 208 form the signal receiving unit.

The controller 201 transmits transmission data to the driver 204 and receives reception data from the comparator 205. The driver 204 generates a signal having a voltage level of 0 to 2.5 V corresponding to the transmission data transmitted from the controller 201, and outputs the signal to the communication line 410. In this case, for example, the logic "0" of the transmission data is 0 V and the logic "1" is 2.5 V. A signal is input from the communication line 410 to a positive input terminal of the comparator 205, and a threshold Vth2 is given to a negative input terminal of the comparator 205. The comparator 205 outputs "0" when the signal level is lower than the threshold Vth2, and outputs "1" when the signal level is equal to or greater than the threshold Vth2. Here, as described above, the threshold Vth2 is set to a value between 0 V and 2.5 V, for example, 1.25 V.

The controller 206 transmits transmission data to the driver 207 and receives reception data from the comparator 208. The driver 207 generates a signal having a voltage level of 2.5 to 5 V corresponding to the transmission data transmitted from the controller 206, and outputs the signal to the communication line 410. In this case, for example, the logic "0" of the transmission data is 2.5 V and the logic "1" is 5 V. A signal is input from the communication line 410 to a positive input terminal of the comparator 208, and a threshold Vth1 is given to a negative input terminal of the comparator 208. The comparator 208 outputs "0" when the signal level is lower than the threshold Vth1, and outputs "1" when the signal level is equal to or greater than the threshold Vth1.

A case where data is transmitted from the source device 100 to the sink device 200 will be described. In this case, transmission data is transmitted from the controller 101 of the source device 100 to the driver 102. The driver 102 generates a signal having a voltage level of 0 to 2.5 V corresponding to the transmission data and outputs the signal to the communication line 410. The signal having the voltage level of 0 to 2.5 V is input from the communication line 410 to the positive input terminal of the comparator 306 of the cable 300.

In the comparator 306, the threshold Vth2 is, for example, 1.25 V, so that the signal having the voltage level of 0 to 2.5 V is received (detected), and is output to the communication line 410 as a signal having the voltage level of 0 to 2.5 V. The signal having the voltage level of 0 to 2.5 V is input to the positive input terminal of the comparator 205 of the sink device 200 from the communication line 410. In the comparator 205, the threshold Vth2 is 1.25 V, so that a signal having a voltage level of 0 to 2.5 V is received (detected), and reception data that is the output data of the comparator 205 is transmitted to the controller 201.

Note that, in this case, in the cable 300, a signal having a voltage level of 0 to 2.5 V is input also to the positive input terminal of the comparator 303 from the communication line 410. In the comparator 303, the threshold Vth1 is, for example, 3.75 V, so that a signal having a voltage level of 0 to 2.5 V is not received (detected). That is, in this case, the output of the comparator 303 remains "0", and the controller 301 of the cable 300 cannot receive the data.

Furthermore, in this case, in the cable 300, a signal having a voltage level of 0 to 2.5 V is input also to the positive input terminal of the comparator 309 from the communication line 410. In the comparator 309, the threshold Vth1 is, for example, 3.75 V, so that a signal having a voltage level of 0 to 2.5 V is not received (detected). That is, in this case, the output of the comparator 309 remains "0", and the controller 307 of the cable 300 cannot receive the data.

Next, a case where data is transmitted from the sink device 200 to the source device 100 will be described. In this case, transmission data is transmitted from the controller 201 of the sink device 200 to the driver 204. The driver 204 generates a signal having a voltage level of 0 to 2.5 V corresponding to the transmission data and outputs the signal to the communication line 410. The signal having the voltage level of 0 to 2.5 V is input from the communication line 410 to the positive input terminal of the comparator 310 of the cable 300.

In the comparator 310, the threshold Vth2 is, for example, 1.25 V, so that the signal having the voltage level of 0 to 2.5 V is received (detected), and is output to the communication line 410 as a signal having the voltage level of 0 to 2.5 V. The signal having the voltage level of 0 to 2.5 V is input to the positive input terminal of the comparator 103 of the source device 100 from the communication line 410. In the comparator 103, the threshold V1 is 1.25 V, so that a signal having a voltage level of 0 to 2.5 V is received (detected), and reception data that is the output data of the comparator 103 is transmitted to the controller 101.

Note that, in this case, in the cable 300, a signal having a voltage level of 0 to 2.5 V is input also to the positive input terminal of the comparator 309 from the communication line 410. In the comparator 309, the threshold Vth1 is, for example, 3.75 V, so that a signal having a voltage level of 0 to 2.5 V is not received (detected). That is, in this case, the output of the comparator 309 remains "0", and the controller 307 of the cable 300 cannot receive the data.

Furthermore, in this case, in the cable 300, a signal having a voltage level of 0 to 2.5 V is input also to the positive input terminal of the comparator 303 from the communication line 410. In the comparator 303, the threshold Vth1 is, for example, 3.75 V, so that a signal having a voltage level of 0 to 2.5 V is not received (detected). That is, in this case, the output of the comparator 303 remains "0", and the controller 301 of the cable 300 cannot receive the data.

Next, a case of transmitting data from the source device 100 to the cable 300 will be described. In this case, transmission data is transmitted from the controller 104 of the source device 100 to the driver 105. The driver 105 generates a signal having a voltage level of 2.5 to 5 V corresponding to the transmission data and outputs the signal to the communication line 410. The signal having the voltage level of 2.5 to 5 V is input from the communication line 410 to the positive input terminal of the comparator 303 of the cable 300. In the comparator 303, the threshold Vth1 is, for example, 3.75 V, so that a signal having a voltage level of 2.5 to 5 V is received (detected), and reception data that is the output data of the comparator 303 is transmitted to the controller 301.

Note that, in this case, in the cable 300, a signal having a voltage level of 2.5 to 5 V is input also to the positive input terminal of the comparator 306 from the communication line 410. In the comparator 306, the threshold Vth2 is, for example, 1.25 V, so that a signal having a voltage level of 2.5 to 5 V is not received (detected). That is, in this case, the output of the comparator 306 remains 2.5 V, and the signal is not transmitted to the sink device 200 side.

Next, a case of transmitting data from the cable 300 to the source device 100 will be described. In this case, transmission data is transmitted from the controller 301 of the cable 300 to the driver 302. The driver 302 generates a signal having a voltage level of 2.5 to 5 V corresponding to the transmission data and outputs the signal to the communication line 410. The signal having the voltage level of 2.5 to 5 V is input to the positive input terminal of the comparator 106 of the source device 100 from the communication line 410. In the comparator 106, the threshold Vth1 is, for example, 3.75 V, so that a signal having a voltage level of 2.5 to 5 V is received (detected), and reception data that is the output data of the comparator 106 is transmitted to the controller 104.

Note that, in this case, in the cable 300, a signal having a voltage level of 2.5 to 5 V is input also to the positive input terminal of the comparator 306 from the communication line 410. In the comparator 306, the threshold Vth2 is, for example, 1.25 V, so that a signal having a voltage level of 2.5 to 5 V is not received (detected). That is, in this case, the output of the comparator 306 remains 2.5 V, and the signal is not transmitted to the sink device 200 side.

Next, a case of transmitting data from the sink device 200 to the cable 300 will be described. In this case, transmission data is transmitted from the controller 206 of the sink device 200 to the driver 207. The driver 207 generates a signal having a voltage level of 2.5 to 5 V corresponding to the transmission data and outputs the signal to the communication line 410. The signal having a voltage level of 2.5 to 5 V is input from the communication line 410 to the positive input terminal of the comparator 309 of the cable 300. In the comparator 309, the threshold Vth1 is, for example, 3.75 V, so that a signal having a voltage level of 2.5 to 5 V is received (detected), and reception data that is the output data of the comparator 309 is transmitted to the controller 307.

Note that, in this case, in the cable 300, a signal having a voltage level of 2.5 to 5 V is input also to the positive input terminal of the comparator 310 from the communication line 410. In the comparator 310, the threshold Vth2 is, for example, 1.25 V, so that a signal having a voltage level of 2.5 to 5 V is not received (detected). That is, in this case, the output of the comparator 310 remains 2.5 V, and the signal is not transmitted to the source device 100 side.

Next, a case of transmitting data from the cable 300 to the sink device 200 will be described. In this case, transmission data is transmitted from the controller 307 of the cable 300 to the driver 308. The driver 308 generates a signal having a voltage level of 2.5 to 5 V corresponding to the transmission data and outputs the signal to the communication line 410. The signal having the voltage level of 2.5 to 5 V is input to the positive input terminal of the comparator 208 of the sink device 200 from the communication line 410. In the comparator 208, the threshold Vth1 is, for example, 3.75 V, so that a signal having a voltage level of 2.5 to 5 V is received (detected), and reception data that is the output data of the comparator 208 is transmitted to the controller 206.

Note that, in this case, in the cable 300, a signal having a voltage level of 2.5 to 5 V is input also to the positive input terminal of the comparator 310 from the communication line 410. In the comparator 310, the threshold Vth2 is, for example, 1.25 V, so that a signal having a voltage level of 2.5 to 5 V is not received (detected). That is, in this case, the output of the comparator 310 remains 2.5 V, and the signal is not transmitted to the source device 100 side.

As described above, in the transmission system 10C shown in FIG. 5, the source device 100 and the sink device 200, the source device 100 and the cable 300, and the sink device 200 and the cable 300 can independently communicate with each other, transmitting and receiving of signals between the source device 100 and the cable 300 is not transmitted to the sink device 200, and transmitting and receiving of signals between the sink device 200 and the cable 300 is not transmitted to the source device 100. In this case, without logically analyzing the contents of the signal, the cable 300 can immediately determine whether or not it is information to be passed to the sink device 200 or the source device 100 of the subsequent stage on the basis of only the difference in the voltage level, and cost of components such as a memory, verification cost, or the like are not necessary and the cost can be reduced.

Note that, in the configuration of the transmission system 10C shown in FIG. 5, the source device 100 includes the controller 101 and the controller 104, but these may be configured as one controller. Furthermore, a case has been described in which, in the configuration of the transmission system 10C shown in FIG. 5, the source device 100 has a separate driver for generating and transmitting a signal having a voltage level of 0 to 2.5 V and a signal having a voltage level of 2.5 to 5 V, and has a separate comparator for receiving each signal. However, a configuration in which one is used for each of them is conceivable (see the transmission system 10A' in FIG. 3). Although detailed description is omitted, this is similar for the sink device 200.

Fourth Embodiment

Figure 6:
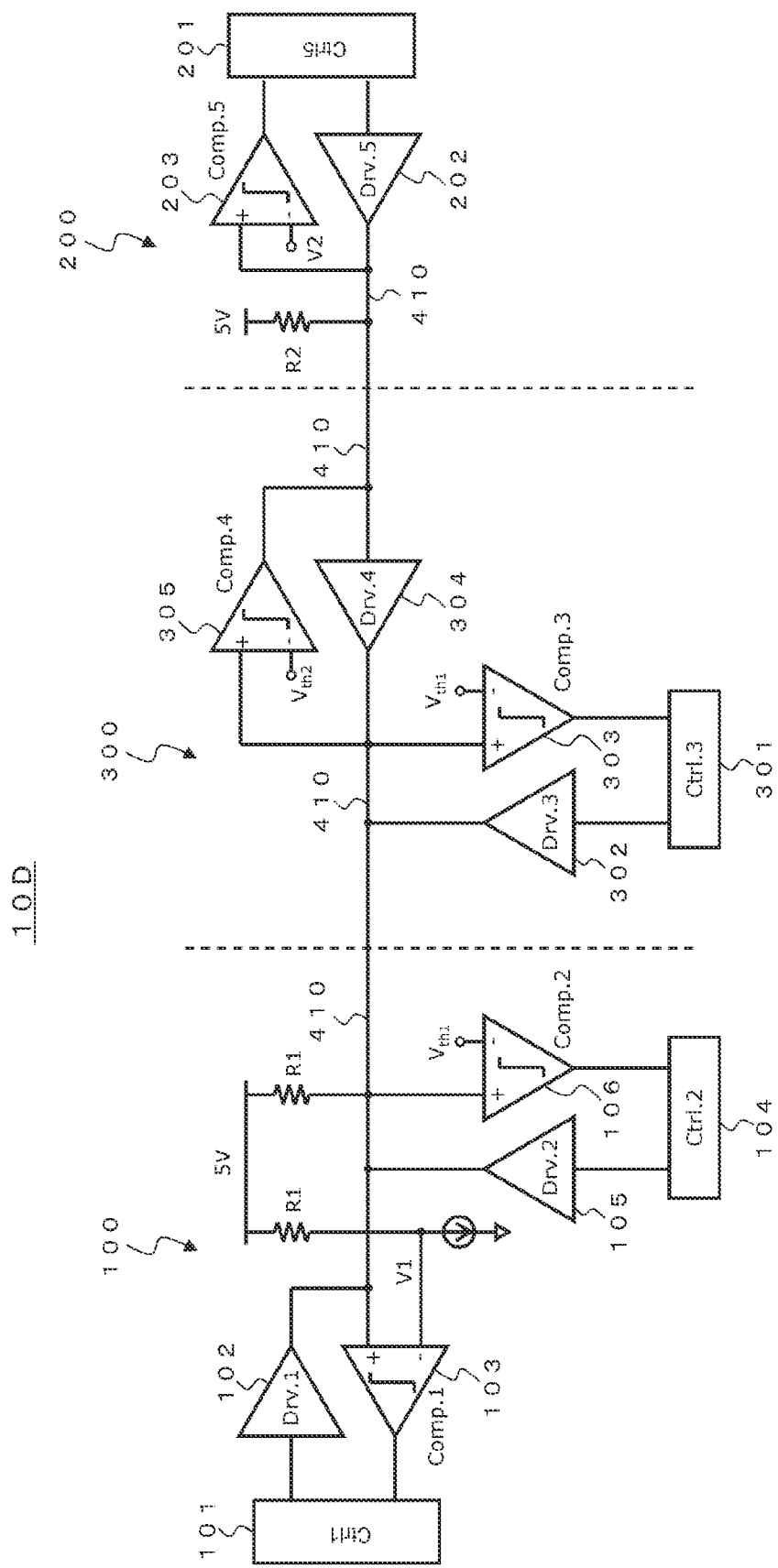
FIG. 6 is a diagram showing a configuration example of a transmission system as a fourth embodiment.

FIG. 6 shows a configuration example of a transmission system 10D as a fourth embodiment. In this FIG. 6, parts corresponding to those in FIG. 1 are designated by the same reference numerals, and detailed description thereof will be appropriately omitted. The transmission system 10D performs communication by, for example, an inter-integrated circuit (I2C). As is well known, since an I2C is driven by a current, data of "0" and "1" is generated by subtracting a current from a pull-up resistor.

The driver (Drv.1) 102 of the source device 100 and the driver (Drv.4) 304 of the cable 300 draw a current through a resistor R1 so that a signal having a voltage level of 0 to 2.5 V is obtained. Since the signal input to the positive input terminal of the comparator (Comp.1) 103 is generated by drawing the current from the 5 V power supply through the resistor R1, the threshold V1 is also generated by drawing the current from the 5 V power supply through the resistor R1. Therefore, it is possible to follow the fluctuations of the 5 V power supply such as noise, and increase the stability of the signal. Although not shown, this is similar for the comparator (Comp.2) 106, the comparator (Comp.3) 303, the comparator (Comp.4) 305, and the comparator (Comp.5) 203.

Note that, in a case of the I2C, the communication line includes two lines, serial data (SDA) and serial clock (SCL). Therefore, it is necessary to mount the above circuit on both SDA and SCL. However, the present technology is not limited to the I2C, and in a case of a protocol that does not require a clock in the first place, a case of a system in which a clock is superimposed on data, or the like, it is sufficient if the above circuit is mounted on one communication line.

Figure 7:
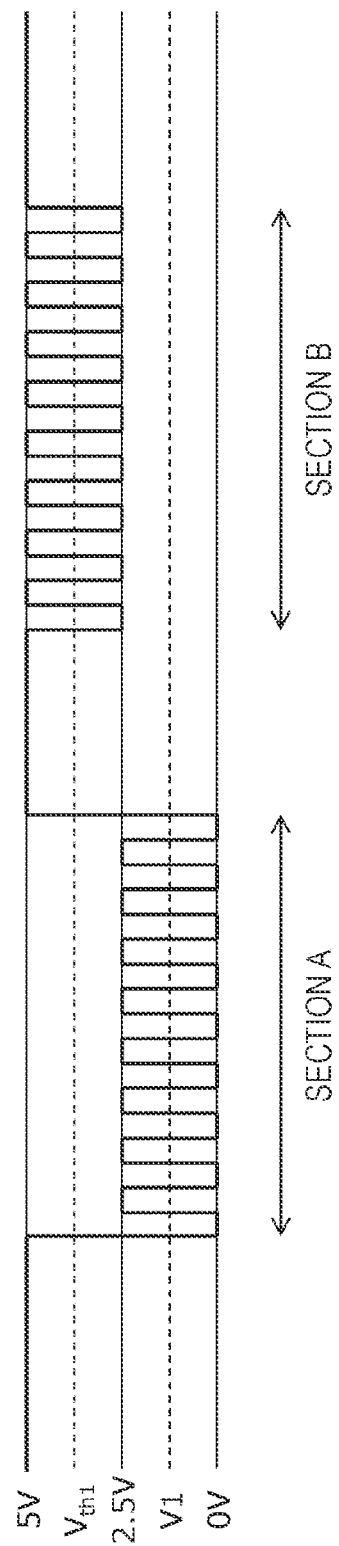
FIG. 7 is a diagram showing an example of a sequence of communication between a source device and a sink device and communication between a source device and a cable.

FIG. 7 shows an example of a sequence of communication between the source device 100 and the sink device 200 and communication between the source device 100 and the cable 300 in the transmission system 10D. A section A indicates a section in which the source device 100 and the sink device 200 communicate with each other with a signal having a voltage level of 0 to 2.5 V, and a section B indicates a section in which the source device 100 and the cable 300 communicate with each other with a signal having a voltage level of 2.5 to 5 V.

In this case, since a signal is generated by drawing a current from a 5 V power supply through a resistor, the signal crosses the threshold Vth1 at the first fall and the last rise of the section A, so that the output data of the comparator 303 of the cable 300 changes from "1" to "0" at the fall and from "0" to "1" at the rise, and the controller 301 of the cable 300 needs to ignore such change information. For example, as a method of ignoring, a conceivable method is a method of determining that it is a section in which communication is performed between the source device 100 and the sink device 200, if a signal does not come within a certain time after fall detection.

Although detailed description is omitted, the transmission system 10D shown in FIG. 6 is configured in a similar manner, performs similar communication operation, and provides a similar effect, to the transmission system 10A of FIG. 1, except that the transmission system 10D is driven by current as described above. Note that although the transmission system 10D shown in FIG. 6 corresponds to the transmission system 10A of FIG. 1, a configuration corresponding to the transmission system 10C of FIG. 5 is conceivable in a similar manner.

Fifth Embodiment

Figure 8:
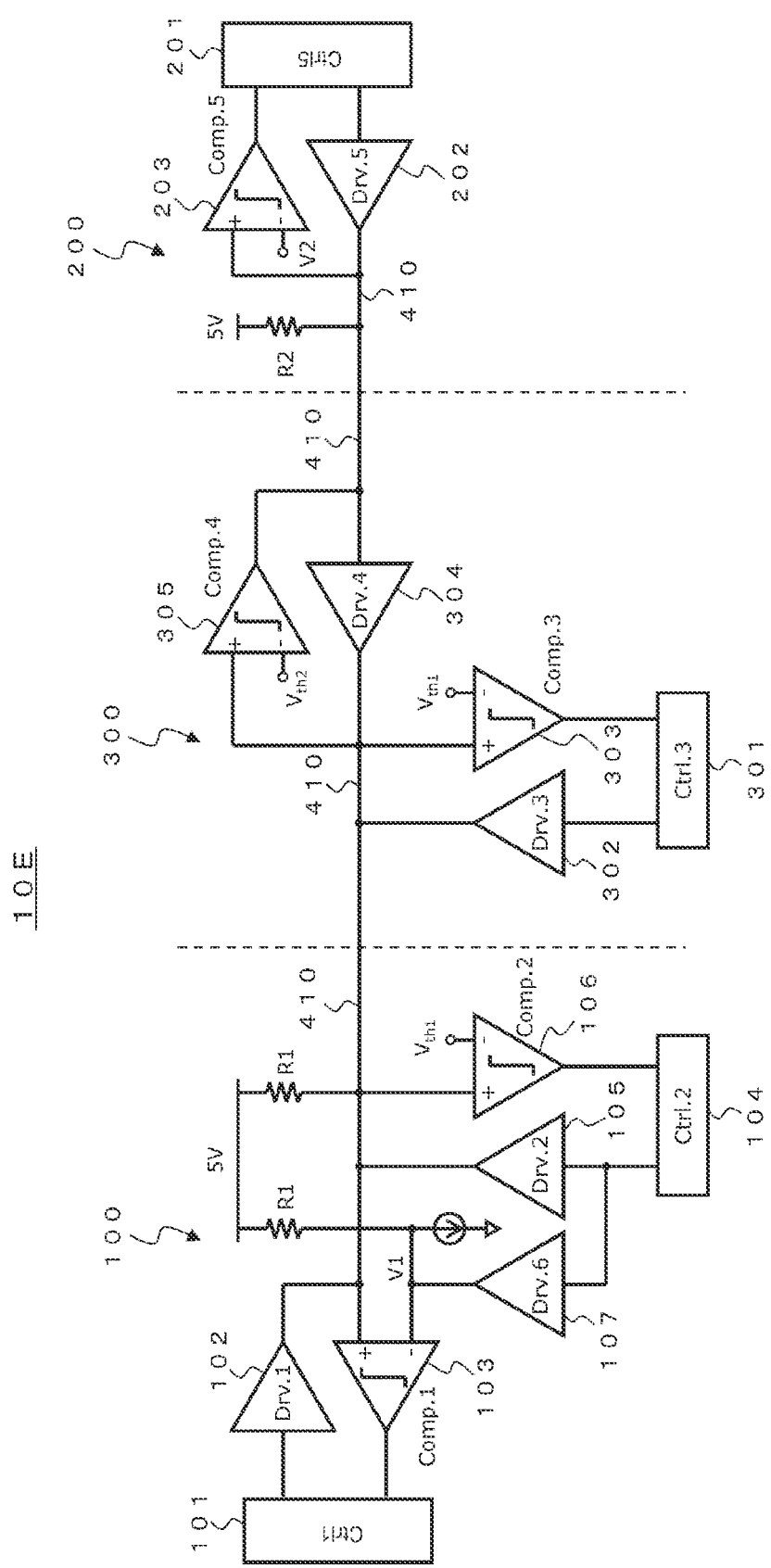
FIG. 8 is a diagram showing a configuration example of a transmission system as a fifth embodiment.

FIG. 8 shows a configuration example of a transmission system 10E as a fifth embodiment. This transmission system 10E also performs communication by, for example, the I2C, as similar to the transmission system 10D of FIG. 6. In this FIG. 8, parts corresponding to those in FIG. 6 are designated by the same reference numerals, and detailed description thereof will be appropriately omitted.

In the source device 100, a driver (Drv.6) 107 that drives in synchronization with the driver (Drv.2) 105 is connected to the negative input terminal on the threshold side of the comparator (Cmp.1) 103. Others are configured similarly to the transmission system 10D of FIG. 6.

Figure 9:
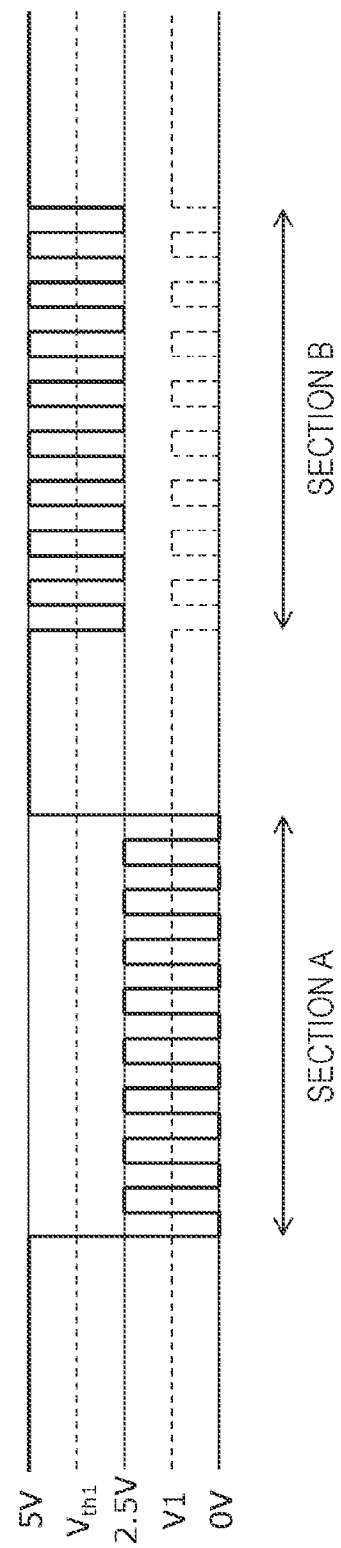
FIG. 9 is a diagram showing control of a threshold for keeping the quality of output data high.

In the source device 100, as the driver 107 is connected, as shown in FIG. 9, in the section B in which communication is performed between the source device 100 and the cable 300, the threshold V1 of the comparator (Cmp.1) 103 changes according to the signal having a voltage level of 2.5 to 5 V generated by driving the driver 105. Therefore, in the comparator (Cmp.1) 103, the voltage difference between the signal having a voltage level of 2.5 to 5 V input to the positive input terminal and the threshold V1 input to the negative input terminal can always be kept above a certain level. Accordingly, even in a case where noise is added to the signal having a voltage level of 2.5 to 5 V, for example, it is possible to avoid output an erroneous signal to the output side of the comparator 103. That is, the quality of the output data of the comparator 103 can be kept high.

Note that, although detailed description is omitted, in the cable 300, by connecting a driver that drives in synchronization with the driver (Drv.3) 302 to the negative input terminal that is the threshold side of the comparator (Cmp.4) 305, the quality of the output data of the comparator 305 can be kept high as similar to the comparator 103 of the source device 100 described above.

Sixth Embodiment

Figure 10:
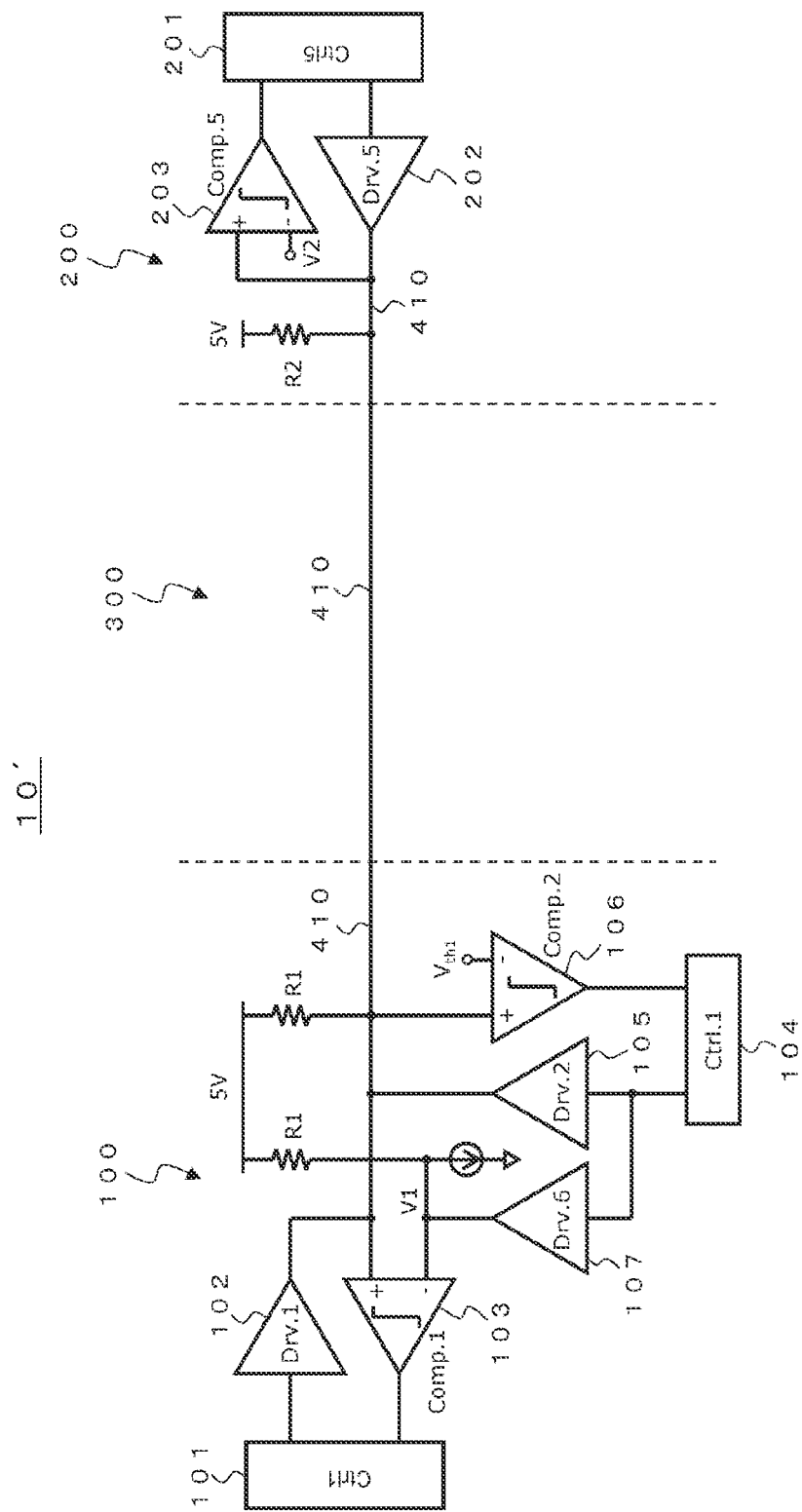
FIG. 10 is a diagram showing a configuration example of a transmission system in a case where a legacy cable is connected.

In each of the embodiments described above, the cable 300 corresponds to the present technology. FIG. 10 shows a transmission system 10' in a case where a legacy cable 300' is connected. In this FIG. 10, parts corresponding to those in FIG. 8 are designated by the same reference numerals. In this transmission system 10', the source device 100 and the sink device 200 are the same as the source device 100 and the sink device 200 in the transmission device 10E of FIG. 8, respectively.

In a case of the transmission system 10' of FIG. 10, when communication is performed between the source device 100 and the sink device 200, since the source device 100 does not know whether the connected cable 300' is a compatible cable or a non-compatible cable, a signal having a voltage level of 0 to 2.5 V is output from the driver 102 to the communication line 410. However, in a case where the sink device 200 is legacy, there is a possibility that the signal having a voltage level of 0 to 2.5 V cannot be received. Accordingly, it is preferable that the source device 100 transmits a signal after determining whether the connected cable is a compatible cable or a non-compatible cable.

Figure 11:
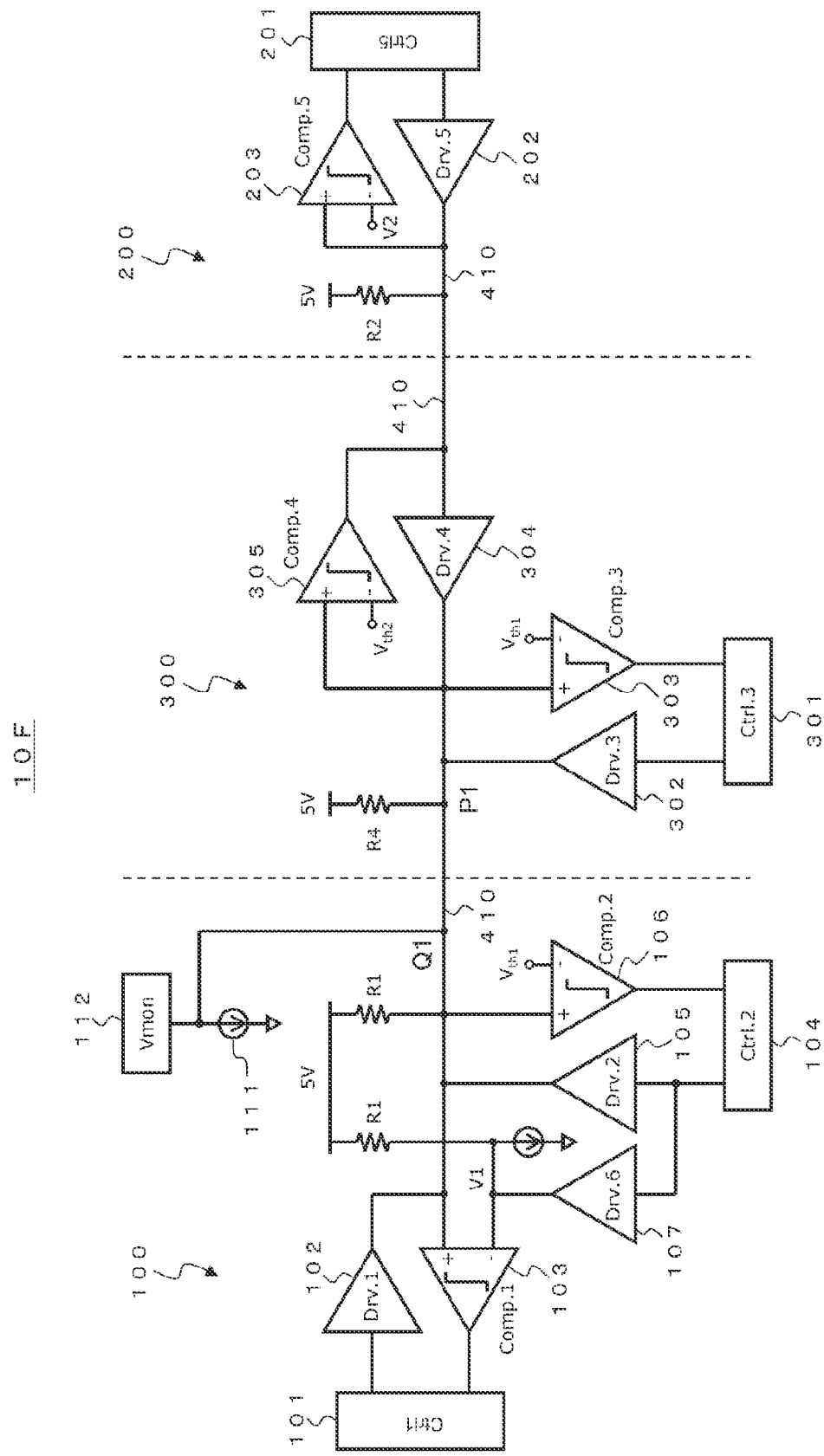
FIG. 11 is a diagram showing a configuration example of a transmission system as a sixth embodiment.

FIG. 11 shows a configuration example of a transmission system 10F as a sixth embodiment. In this FIG. 11, parts corresponding to those in FIG. 8 are designated by the same reference numerals, and detailed description thereof will be appropriately omitted.

In the cable 300, a pull-up resistor R4 is connected to a point P1 on the source device 100 side of the communication line 410. In the sink device 200, the pull-up resistor R4 is set to a value different from that of a pull-up resistor R2 connected to the communication line. Furthermore, in the source device 100, the constant current circuit 111 is connected to a point Q1 of the communication line 410 on the cable 300 side. Then, in the source device 100, the voltage at the point Q1 is monitored by a voltage monitor unit 112. Others are configured similarly to the transmission system 10E of FIG. 8.

In the source device 100, when the current is drawn in the constant current circuit 111, the voltage value at the point Q1 (voltage value of the communication line 410) monitored by the voltage monitor unit 112 is different between when the compatible cable 300 is connected as the transmission system 10F of FIG. 11 and when the legacy cable 300' (see FIG. 10) is connected. Therefore, the source device 100 can determine whether the connected cable is a compatible cable or a non-compatible cable, and can perform appropriate operation depending on whether the cable is a compatible cable or a non-compatible cable.

Figure 12:
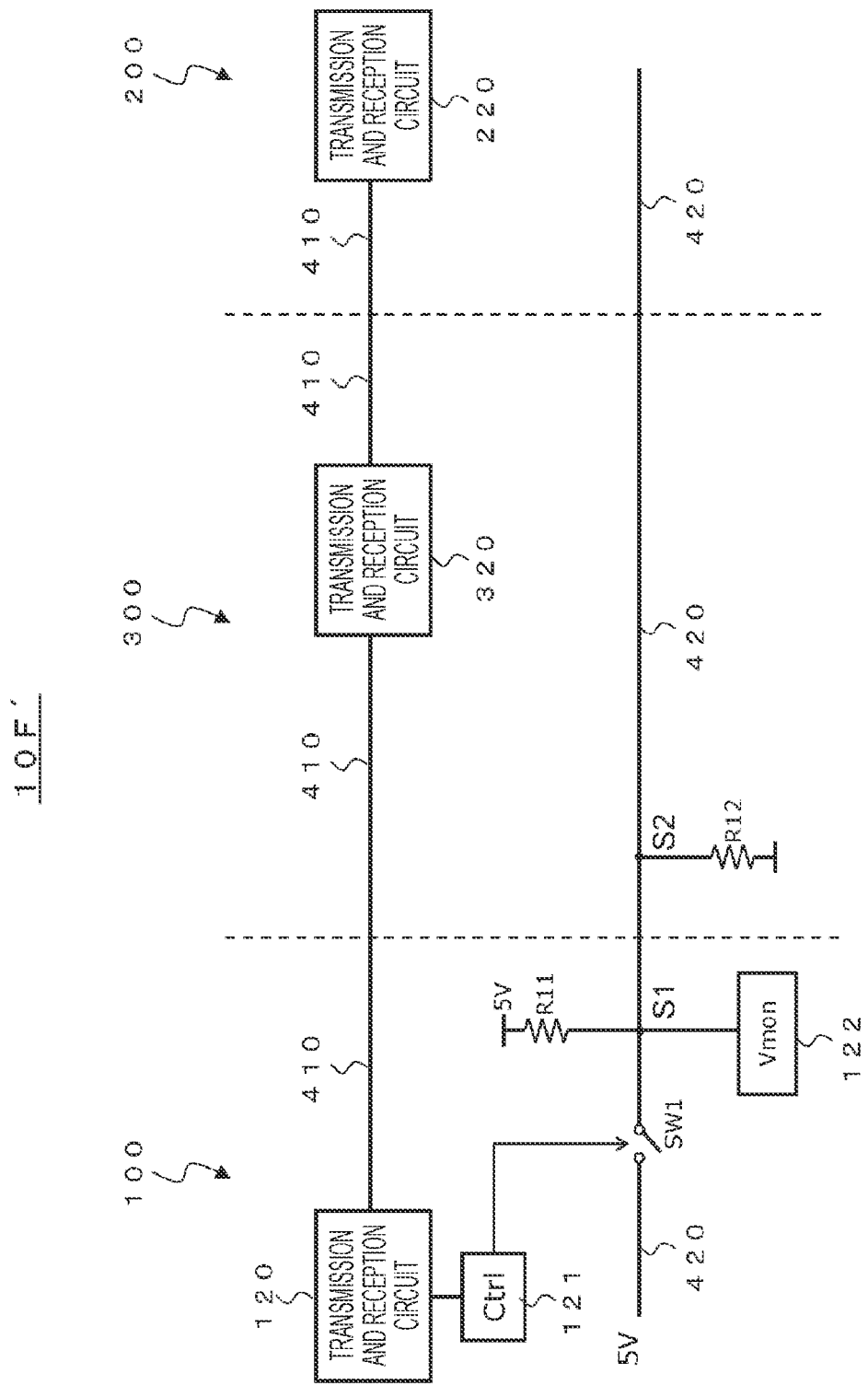
FIG. 12 is a diagram showing a configuration example of a transmission system configured to determine whether a cable is a compatible cable or a non-compatible cable by using a power supply line.

Note that using a line other than the communication line is conceivable as a method of determining whether the connected cable is a compatible cable or a non-compatible cable by the source device 100. For example, FIG. 12 shows a configuration example of a transmission system 10F" configured to make a determination using a power supply line.

This transmission system 10F' has a configuration in which the source device 100 and the sink device 200 are connected by the cable 300. The source device 100 includes a transmission and reception circuit 120, a controller 121, and a voltage monitor unit 122. The transmission and reception circuit 120 collectively represents, for example, the communication function units of the source device 100 of the transmission system 10E of FIG. 8. The controller 121 is a part that controls the entire source device 100.

In the source device 100, a switch SW1 is inserted in a 5 V power supply line 420. Opening and closing of this switch SW is controlled by the controller 121. In the source device 100, a point S1 on the cable 300 side from the switch SW1 is connected to the 5 V power source via a resistor R11. The voltage monitor unit 122 monitors the voltage at this point S1.

The cable 300 has a transmission and reception circuit 320. The transmission and reception circuit 320 collectively represents, for example, the communication function units of the cable 300 of the transmission system 10E of FIG. 8. In the cable 300, a point S2 of the 5 V power supply line 420 is grounded via a resistor R12. Furthermore, the sink device 200 includes a transmission and reception circuit 220. The transmission and reception circuit 220 collectively represents, for example, the communication function units of the sink device 200 of the transmission system 10E of FIG. 8.

When detecting that the cable is connected by some means, the source device 100 opens the switch SW1 as shown in the drawing, determines whether the connected cable is a compatible cable or a non-compatible cable on the basis of the voltage value at the point S2 monitored by the voltage monitor unit 122, and performs appropriate operation depending on whether the cable is a compatible cable or a non-compatible cable. In this case, in a case where the compatible cable 300 is connected as in the transmission system 10F' of FIG. 12, the voltage value at the point S1 is a voltage obtained by dividing 5V by the resistors R11, R12. On the other hand, in a case where the legacy cable 300' (see FIG. 10), which is a non-compatible cable, is connected, the voltage value at the point S1 remains 5 V.

Seventh Embodiment

Figure 13:
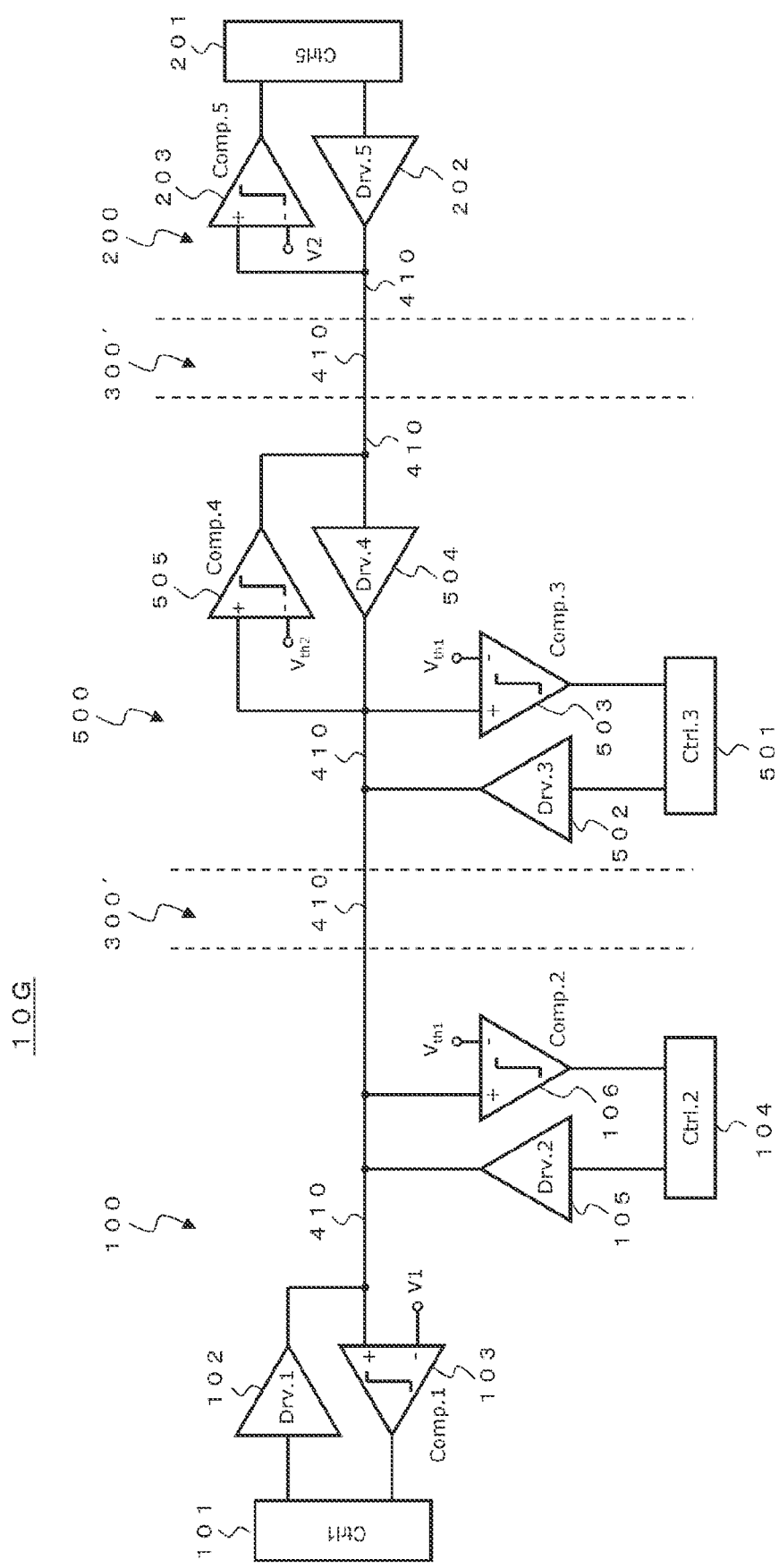
FIG. 13 is a diagram showing a configuration example of a transmission system as a seventh embodiment.

FIG. 13 shows a configuration example of a transmission system 10G as a seventh embodiment. The transmission system 10G includes the source device 100, an intermediate device 500 such as a repeater device, the sink device 200, and a legacy cable 300' connecting these devices. Note that, in the example shown in the drawing, the number of intermediate devices 500 is one, but a plurality of intermediate devices may be daisy chained. This transmission system 10G is configured such that the source device 100 and the sink device 200, and the source device 100 and the intermediate device 500 can independently communicate with each other, and transmitting and receiving of signals between the source device 100 and the intermediate device 500 is not transmitted to the sink device 200.

The source device 100 includes the controller 101, the driver 102, the comparator 103, the controller 104, the driver 105, and the comparator 106. Although detailed description is omitted, this is similar to the configuration of the source device 100 in the transmission system 10A of FIG. 1.

The intermediate device 500 includes a controller (Ctrl.3) 501, a driver (Drv.3) 502, a comparator (Comp.3) 503, a driver (Drv.4) 504, and a comparator (Comp.4) 505. Although detailed description is omitted, this is similar to the configuration of the cable 300 in the transmission system 10A of FIG. 1.

The sink device 200 is a legacy source device. The source device 200 includes the controller 201, the driver 202, and the comparator 203. Although detailed description is omitted, this is similar to the configuration of the sink 200 in the transmission system 10A of FIG. 1.

Although detailed description is omitted, the communication operation between the source device 100 and the sink device 200 in the transmission system 10G shown in FIG. 13 is similar to the communication operation between the source device 100 and the sink device 200 in the transmission system 10A of FIG. 1. Furthermore, although detailed description is omitted, the communication operation between the source device 100 and the intermediate device 500 in the transmission system 10G shown in FIG. 13 is similar to the communication operation between the source device 100 and the cable 300 in the transmission system 10A of FIG. 1.

As described above, in the transmission system 10G shown in FIG. 13, the source device 100 and the sink device 200, and the source device 100 and the intermediate device 500 can independently communicate with each other, and transmitting and receiving of signals between the source device 100 and the intermediate device 500 is not transmitted to the sink device 200. In this case, without logically analyzing the contents of the signal, the intermediate device 500 can immediately determine whether or not it is information to be passed to the sink device 200 of the subsequent stage on the basis of only the difference in the voltage level, and cost of components such as a memory, verification cost, or the like are not necessary and the cost can be reduced. For example, for example, in an HDMI repeater device, it is possible not to pass the signal between the source device and the repeater device to the sink device, but in order to determine whether or not the data is to be transferred to the sink device side, the data needs to be stored in a memory and analyzed.

Note that the transmission system 10G shown in FIG. 13 is capable of performing communication between the source device 100 and the intermediate device 500, but a configuration capable of performing communication between the sink device 200 and the intermediate device 500, and further, a configuration capable of performing communication both of those are also conceivable (see FIGS. 4 and 5).

Eighth Embodiment

Figure 14:
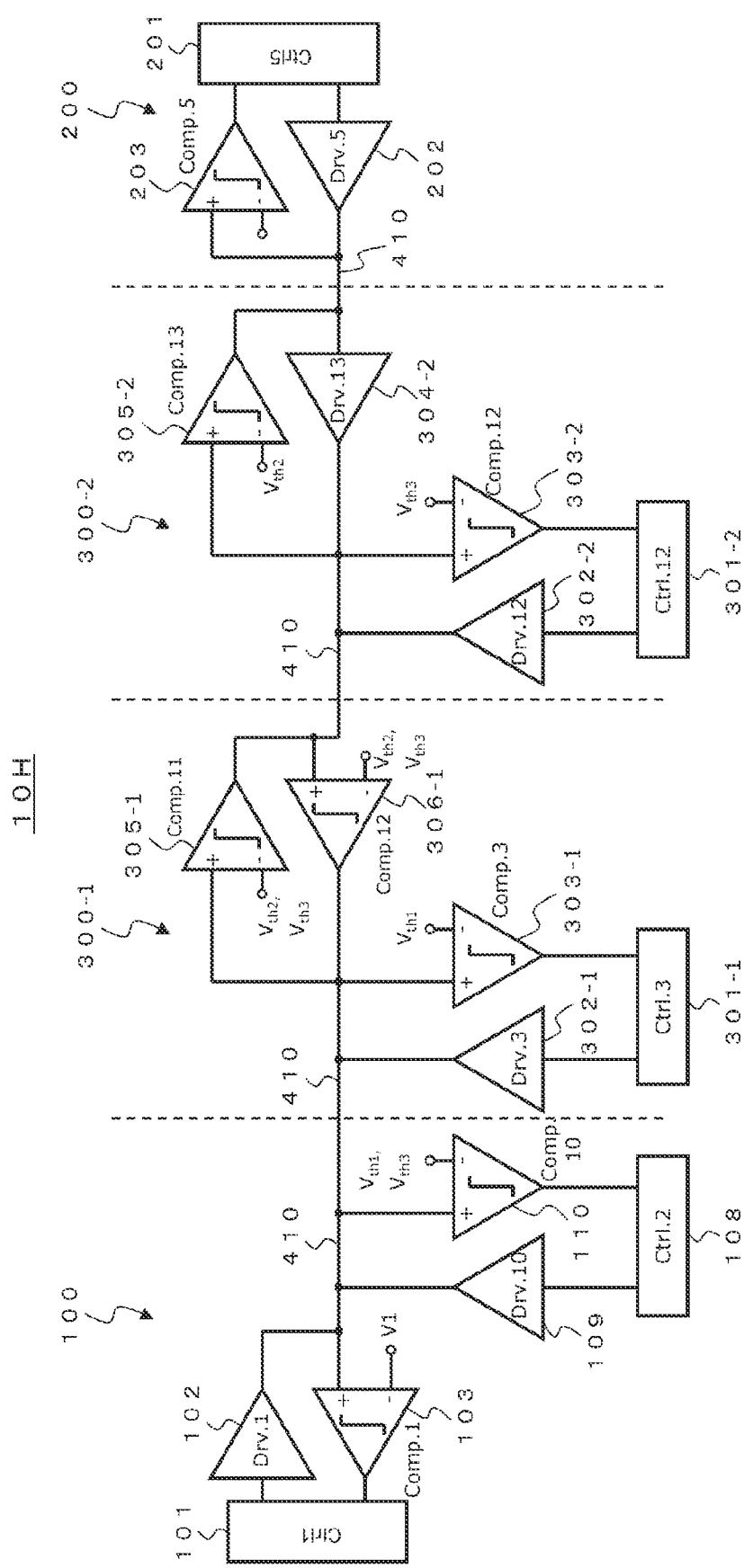
FIG. 14 is a diagram showing a configuration example of a transmission system as an eighth embodiment.

In each of the embodiments described above, an example in which two signals having different voltage levels are handled has been shown, but an example in which three or more signals having different voltage levels are handled is also conceivable. FIG. 14 shows a configuration example of a transmission system 10H as an eighth embodiment. This transmission system 10H is an example of handling three signals having different voltage levels.

This transmission system 10H includes the source device 100, the sink device 200, and cables 300-1, 300-2 connecting these. This transmission system 10H is configured such that the source device 100 and the sink device 200, the source device 100 and the cable 300-1, and the source device 100 and the cable 300-2 can independently communicate with each other, and transmitting and receiving of signals between the source device 100 and the cables 300-1, 300-2 is not transmitted to the subsequent stage.

The voltage level of the signal output from the source device 100 to the communication line is changed between when the source device 100 and the sink device 200 communicate and when the source device 100 and the cables 300-1, 300-2 communicate, so that independent communication is enabled. The cables 300-1, 300-2 are configured such that, at the voltage level at which the source device 100 and the sink device 200 communicate with each other, the signal from the source device 100 is directly transmitted to the sink device 200, and at the voltage level at which the source device 100 and the cables 300-1, 300-2 communicate with each other, the signal from the source device 100 is received but is not transmitted to the subsequent stage.

The source device 100 includes the controller (Ctrl.1) 101, the driver (Drv.1) 102, the comparator (Comp.1) 103, the controller (Ctrl.10) 108, the driver (Drv.10) 109, and the comparator (Comp.10) 110.

The controller 101 transmits transmission data to the driver 102 and receives reception data from the comparator 103. The driver 102 generates a signal having a voltage level of 1.7 to 3.3 V corresponding to the transmission data transmitted from the controller 101, and outputs the signal to the communication line 410. In this case, for example, the logic "0" of the transmission data is 1.7 V and the logic "1" is 3.3 V. A signal is input from the communication line 410 to a positive input terminal of the comparator 103, and a threshold V1 is given to a negative input terminal of the comparator 103. Here, the threshold V1 is set to a value between 1.7 V and 3.3 V, for example, 2.5 V. The comparator 103 outputs "0" when the signal level is lower than the threshold V1, and outputs "1" when the signal level is equal to or greater than the threshold V1.

The controller 108 transmits transmission data to the driver 109 and receives reception data from the comparator 110. The driver 109 generates a signal corresponding to the transmission data transmitted from the controller 108, and outputs the signal to the communication line 410. In a case of communicating with the cable 300-1, a signal having a voltage level of 0 to 1.7 V is generated and output to the communication line 410. In this case, for example, the logic "0" of the transmission data is 0 V and the logic "1" is 1.7 V. Furthermore, in a case of communicating with the cable 300-2, a signal having a voltage level of 3.3 to 5 V is generated and output to the communication line 410. In this case, for example, the logic "0" of the transmission data is 3.3 V and the logic "1" is 5 V.

A signal is input from the communication line 410 to a positive input terminal of the comparator 110, and thresholds Vth1/Vth3 are given to a negative input terminal of the comparator 110. The threshold Vth3 is set to a value between 0 V and 1.7 V, for example 0.85 V, and the threshold Vth1 is set to a value between 3.3 V and 5 V, for example 4.15 V. The comparator 110 outputs "0" when the signal level is lower than the thresholds Vth1/Vth3, and outputs "1" when the signal level is equal to or greater than the thresholds Vth1/Vth3.

The cable 300-1 is the controller (Ctrl.3) 301-1, the driver (Drv.3) 302-1, the comparator (Comp.3) 303-1, the comparator (Comp.11) 305-1, the comparator (Comp.12) 306-1.

The controller 301-1 transmits transmission data to the driver 302-1 and receives reception data from the comparator 303-1. The driver 302-2 generates a signal having a voltage level of 3.3 to 5 V corresponding to the transmission data transmitted from the controller 301-1, and outputs the signal to the communication line 410. In this case, for example, the logic "0" of the transmission data is 3.3 V and the logic "1" is 5 V. A signal is input from the communication line 410 to a positive input terminal of the comparator 303-1, and a threshold Vth1 is given to a negative input terminal of the comparator 303-1. The comparator 303-1 outputs "0" when the signal level is lower than the threshold Vth1, and outputs "1" when the signal level is equal to or greater than the threshold Vth1.

The comparators 305-1, 306-1 are inserted in the communication line 410 while being connected in parallel. A signal is input from the communication line 410 on the source device 100 side to a positive input terminal of the comparator 305-1, and the thresholds Vth2/Vth3 is given to a negative input terminal of the comparator 305-1. The threshold Vth2 is set to a value between 1.7 V and 3.3 V, for example, 2.5 V. The comparator 305-1 outputs the signals detected by the thresholds Vth2/Vth3 as signals having the same voltage level. That is, when the input signal is a signal having a voltage level of 1.7 to 3.3 V, this is detected (received) at the threshold Vth2, and is output as it is as a signal having a voltage level of 1.7 to 3.3 V. Furthermore, when the input signal is a signal having a voltage level of 0.1 to 7 V, this is detected (received) at the threshold Vth3, and is output as it is as a signal having a voltage level of 0.1 to 7 V.

A signal is input from the communication line 410 on the cable 300-2 side to a positive input terminal of the comparator 306-1, and the thresholds Vth2/Vth3 is given to a negative input terminal of the comparator 306-1. As similar to the comparator 305-1, the comparator 306-1 outputs the signals detected at the thresholds Vth2/Vth3 as signals having the same voltage level.

The cable 300-2 includes a controller (Ctrl.12) 301-2, a driver (Drv.12) 302-2, a comparator (Comp.12) 303-2, a driver (Drv.13) 304-2, and a comparator (Comp.13) 305-2.

The controller 301-2 transmits transmission data to the driver 302-2 and receives reception data from the comparator 303-2. The driver 302-2 generates a signal having a voltage level of 0 to 1.7 V corresponding to the transmission data transmitted from the controller 301-2, and outputs the signal to the communication line 410. In this case, for example, the logic "0" of the transmission data is 0 V and the logic "1" is 1.7 V. A signal is input from the communication line 410 to a positive input terminal of the comparator 303-2, and a threshold Vth3 is given to a negative input terminal of the comparator 303-2. The comparator 303-2 outputs "0" when the signal level is lower than the threshold Vth3, and outputs "1" when the signal level is equal to or greater than the threshold Vth3.

The driver 304-2 and the comparator 305-2 are inserted to the communication line 410 while being connected in parallel. The driver 304-2 receives a signal from the communication line 410 on the side of the sink device 200 and outputs a signal whose voltage level has been converted from 0 to 5 V to 1.7 to 3.3 V to the communication line 410 on the side of the cable 300-1.

A signal is input from the communication line 410 on the cable 300-1 side to a positive input terminal of the comparator 305-2, and a threshold Vth2 is given to a negative input terminal of the comparator 305-2. The comparator 305-2 outputs 0 V when the signal level is lower than the threshold Vth2, and outputs 5 V when the signal level is equal to or greater than the threshold Vth2. That is, when the voltage level of the signal on the communication line 410 on the cable 300-1 side is 1.7 to 3.3 V, the comparator 305-2 converts the signal into a signal having a voltage level of 0 to 5 V so that the legacy sink device 200 can also receive the signal, and outputs the converted signal to the communication line 410 on the sink device 200 side. The comparator 305-2 is provided so as to transmit a signal having a voltage level of 1.7 to 3.3 V to the sink device 200 as it is, but cut off a signal having a voltage level of 0 to 1.7 V such that the signal is not transmitted to the sink device 200.

The sink device 200 is a legacy sink device. The sink device 200 includes a controller (Ctrl.5) 201, a driver (Drv.5) 202, and a comparator (Comp.5) 203.

The controller 201 transmits transmission data to the driver 202 and receives reception data from the comparator 203. The driver 202 generates a signal having a voltage level of 0 to 5 V corresponding to the transmission data transmitted from the controller 201, and outputs the signal to the communication line 410. In this case, for example, the logic "0" of the transmission data is 0 V and the logic "1" is 5 V. A signal is input from the communication line 410 to a positive input terminal of the comparator 203, and a threshold V2 is given to a negative input terminal of the comparator 203. Here, the threshold V2 is set to a value between 0 V and 5 V, for example, 2.5 V. The comparator 203 outputs "0" when the signal level is lower than the threshold V2, and outputs "1" when the signal level is equal to or greater than the threshold V1.

A case where data is transmitted from the source device 100 to the sink device 200 will be described. In this case, transmission data is transmitted from the controller 101 of the source device 100 to the driver 102. The driver 102 generates a signal having a voltage level of 1.7 to 3.3 V corresponding to the transmission data and outputs the signal to the communication line 410. The signal having the voltage level of 1.7 to 3.3 V is input to the positive input terminal of the comparator 305-1 of the cable 300-1 from the communication line 410 on the source device 100 side. In the comparator 305-1, a signal having a voltage level of 1.7 to 3.3 V is detected at the threshold Vth2 and directly output to the communication line 410 on the cable 300-2 side.

The signal having the voltage level of 1.7 to 3.3 V is input to the positive input terminal of the comparator 305-2 of the cable 300-2 from the communication line 410 on the cable 300-1 side. In the comparator 305-2, the signal having the voltage level of 1.7 to 3.3 V is detected at the threshold Vth2, converted into a signal having the voltage level of 0 to 5 V, and is output to the communication line 410 on the sink device 200 side.

The signal having the voltage level of 0 to 5 V is input to the positive input terminal of the comparator 203 of the sink device 200 from the communication line 410 on the cable 300-2 side. Since the threshold V2 is 2.5 V, in the comparator 203, a signal having a voltage level of 0 to 5 V is detected, and reception data that is the output data of the comparator 203 is transmitted to the controller 201.

In this case, in the cable 300-1, a signal having a voltage level of 1.7 to 3.3 V is input also to the positive input terminal of the comparator 303-1 from the communication line 410. In the comparator 303-1, the threshold Vth1 is, for example, 4.15 V, so that a signal having a voltage level of 1.7 to 3.3 V is not detected. That is, in this case, the output of the comparator 303-1 remains "0", and the controller 301-1 of the cable 300-1 cannot receive the data.

Furthermore, as similar to that, in the cable 300-2, a signal having a voltage level of 1.7 to 3.3 V is input also to the positive input terminal of the comparator 303-2 from the communication line 410. In the comparator 303-2, the threshold Vth3 is, for example, 0.85 V, so that a signal having a voltage level of 1.7 to 3.3 V is not detected. That is, in this case, the output of the comparator 303-2 remains "1", and the controller 301-2 of the cable 300-2 cannot receive the data.

Note that, although not described, similar operation is performed in a case where data is transmitted from the sink device 200 to the source device 100, and the source device 100 receives the data, but the cables 300-1, 300-2 do not receive the data.

Next, a case of transmitting data from the source device 100 to the cable 300-1 will be described. In this case, transmission data is transmitted from the controller 108 of the source device 100 to the driver 109. The driver 109 generates a signal having a voltage level of 3.3 to 5 V corresponding to the transmission data and outputs the signal to the communication line 410. The signal having a voltage level of 3.3 to 5 V is input from the communication line 410 to the positive input terminal of the comparator 303-1 of the cable 300-1. In the comparator 303-1, the threshold Vth1 is, for example, 4.15 V, so that a signal having a voltage level of 3.3 to 5 V is detected, and reception data that is the output data of the comparator 303-1 is transmitted to the controller 301-1.

In this case, in the cable 300-1, a signal having a voltage level of 3.3 to 5 V is input also to the positive input terminal of the comparator 305-1 from the communication line 410. In the comparator 305-1, the negative input terminal is given a threshold Vth2/Vth3, so that a signal having a voltage level of 3.3 to 5 V is not detected. That is, the signal having a voltage level of 3.3 to 5 V is not transmitted to the cable 300-2 or the sink device 200 in the subsequent stage.

Note that, although not described, similar operation is performed in a case where data is transmitted from the cable 300-1 to the source device 100, and the source device 100 receives the data, but the data is not transmitted to the cable 300-2 and the sink device 200 in the subsequent stage.

Next, a case of transmitting data from the source device 100 to the cable 300-2 will be described. In this case, transmission data is transmitted from the controller 108 of the source device 100 to the driver 109. The driver 109 generates a signal having a voltage level of 0 to 1.7 V corresponding to the transmission data and outputs the signal to the communication line 410. This 0 to 1.7 V voltage level signal is input from the communication line 410 to the positive input terminal of the comparator 305-1 of the cable 300-1. In the comparator 305-1, a signal having a voltage level of 0 to 1.7 V is detected at the threshold Vth3 and directly output to the communication line 410 on the cable 300-2 side.

The signal having the voltage level of 0 to 1.7 V is input to the positive input terminal of the comparator 303-2 of the cable 300-2 from the communication line 410 on the cable 300-1 side. In the comparator 303-2, the threshold Vth3 is, for example, 0.85 V, so that a signal having a voltage level of 0 to 1.7 V is detected, and reception data that is the output data of the comparator 303-2 is transmitted to the controller 301-2.

In this case, in the cable 300-2, a signal having a voltage level of 0 to 1.7 V is input also to the positive input terminal of the comparator 305-2 from the communication line 410. In the comparator 305-2, the negative input terminal of the comparator 305-2 is given a threshold Vth2, so that a signal having a voltage level of 0 to 1.7 V is not detected. That is, a signal having a voltage level of 0 to 1.7 V is not transmitted to the sink device 200 in the subsequent stage.

Furthermore, in this case, in the cable 300-1, a signal having a voltage level of 0 to 1.7 V is input also to the positive input terminal of the comparator 303-1 from the communication line 410. In the comparator 303-1, the threshold Vth1 is, for example, 4.15 V, so that a signal having a voltage level of 0 to 1.7 V is not detected. That is, in this case, the output of the comparator 303-1 remains "0", and the controller 301-1 of the cable 300-1 cannot receive the data.

Note that, although not described, similar operation is performed in a case where data is transmitted from the cable 300-2 to the source device 100, and the source device 100 receives the data, but the data is not transmitted to the sink device 200 in the subsequent stage, and the cable 300-1 does not receive the data.

Figure 15:
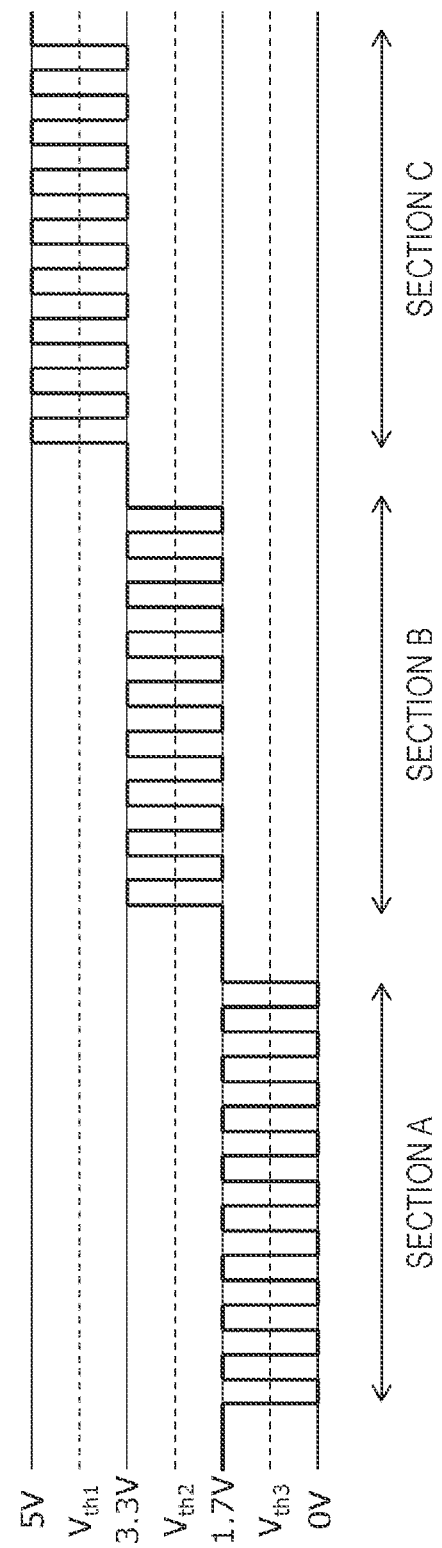
FIG. 15 is a diagram showing an example of a sequence of communication between a source device and a sink device and communication between a source device 100 and a cable.

FIG. 15 shows an example of a sequence of communication between the source device 100 and the sink device 200, communication between the source device 100 and the cable 300-1, and communication between the source device 100 and the cable 300-2. The section B indicates a section in which communication is performed between the source device 100 and the sink device 200 with a signal having a voltage level of 1.7 to 3.3 V. The section A indicates a section in which communication is performed between the source device 100 and the cable 300-2 with a signal having a voltage level of 0 to 1.7 V. The section C indicates a section in which communication is performed between the source device 100 and the cable 300-1 with a signal having a voltage level of 3.3 to 5 V.

As described above, in the transmission system 10H shown in FIG. 14, the source device 100 and the sink device 200, the source device 100 and the cable 300-1, and the source device 100 and the cable 300-2 can independently communicate with each other, and transmitting and receiving of signals between the source device 100 and the cables 300-1, 300-2 is not transmitted to the subsequent stage. In this case, without logically analyzing the contents of the signal, the cables 300-1, 300-2 can immediately determine whether or not it is information to be passed to the subsequent stage on the basis of only the difference in the voltage level, and cost of components such as a memory, verification cost, or the like are not necessary and the cost can be reduced.

2. MODIFICATION

Note that, in the above embodiments, the transmission system in which the source device and the sink device are connected by the HDMI cable has been described as an example. However, since the present technology can be applied similarly to a cable using a mechanism defined by the "VESA Plug and Display (P&D) Specification" for the transmission device and the receiving device, the technology also can be applied to DVI, MHL, Display Port, and the like. Furthermore, it is needless to say that the present technology can be similarly applied to a USB cable and the like.

Furthermore, while preferred embodiments of the present disclosure have been described in detail with reference to the accompanying drawings, the technical scope of the present disclosure is not limited to such examples. It is obvious that various variations and modifications can be conceived within the scope of the technical idea described in the claims by a person having ordinary knowledge in the field of technology to which the present disclosure belongs, and, of course, it is understood that these variations and modifications belong to the technical scope of present disclosure.

Furthermore, the present technology can also adopt the following configuration.

(1) A transmission device including:

a signal generation unit that generates a plurality of signals having different voltage levels; and a signal transmission unit that outputs the plurality of signals having different voltage levels to a communication line at different timings.

(2) The transmission device according to (1) described above, in which the signal generation unit generates the plurality of signals having different voltage levels by a plurality of drivers.

(3) The transmission device according to (1) described above, in which the signal generation unit generates the plurality of signals having different voltage levels by one driver.

(4) The transmission device according to any one of (1) to (3) described above, in which the signal generation unit generates the plurality of signals having different voltage levels by current driving.

(5) The transmission device according to any one of (1) to (4) described above, further including a determination unit that determines whether or not the communication line is connected to a receiving device corresponding to the plurality of signals having different voltage levels.

(6) The transmission device according to (5) described above, in which the determination unit makes determination on the basis of a voltage level of the communication line when a predetermined current is drawn from the communication line.

(7) The transmission device according to (5) described above, in which the determination unit makes determination on the basis of a voltage level of a power supply line when a switch inserted in the power supply line is opened.

(8) The transmission device according to any one of (1) to (7) described above, further including a signal receiving unit that receives the plurality of signals having different voltage levels from the communication line at different timings.

(9) The transmission device according to (8) described above, in which the signal receiving unit transmits a part of the plurality of signals having different voltage levels to a subsequent stage via the communication line.

(10) A transmission method including:

generating a plurality of signals having different voltage levels; and outputting the plurality of signals having different voltage levels to a communication line at different timings.

(11) A receiving device including:

a signal receiving unit that receives a plurality of signals having different voltage levels from a communication line at different timings.

(12) The receiving device according to (11) described above, in which the signal receiving unit includes a comparator having a threshold corresponding to the plurality of signals having different voltage levels.

(13) The receiving device according to (11) or (12) described above, in which the signal receiving unit transmits a part of the plurality of signals having different voltage levels to a subsequent stage via the communication line.

(14) The receiving device according to (13) described above, further including a voltage level conversion unit that converts a voltage level of a signal transmitted to the subsequent stage to another voltage level.

(15) A receiving method including
receiving a plurality of signals having different voltage levels from a communication line at different timings.

REFERENCE SIGNS LIST 10A to 10H, 10' Transmission system
100 Source device
101, 104 Controller
102, 105 Driver
103, 106 Comparator
111 Constant current circuit
112 Voltage monitor unit
120 Transmission and reception circuit
121 Controller
122 Voltage monitor unit
200 Sink device
201, 206 Controller
202, 204, 207 Driver
203, 205, 208 Comparator
220 Transmission and reception circuit
300, 300-1, 300-2, 300'Cable
301, 301-1, 301-2, 307 Controller
302, 302-1, 302-2, 304, 304-2, 308 Driver
303, 303-1, 303-2, 305, 305-1, 305-2, 306, 306-1, 309, 310 Comparator
320 Transmission and reception circuit
410 Communication line
420 Power supply line
500 Intermediate device
501 Controller
502, 504 Driver
503, 505 Comparator

The invention claimed is:

1. A transmission device, comprising:
a first driver configured to generate a first signal of a plurality of signals, wherein the first signal has a first voltage level;
a second driver configured to generate a second signal of the plurality of signals, wherein the second signal has a second voltage level different from the first voltage level;
a comparator;
a third driver connected to the comparator; and
circuitry configured to:
determine, based on a third voltage level at a point on a communication line when a current is drawn from the communication line, whether the communication line is connected to a receiving device, wherein the point is toward a cable on the communication line;
control the third driver to change a threshold voltage of the comparator, wherein the change of the threshold voltage of the comparator is based on
the determination that the communication line is connected to the receiving device, and
the second voltage level of the second signal generated by the second driver; and
output, based on the determination that the communication line is connected to the receiving device, the plurality of signals having different voltage levels to the communication line at different timings.

2. The transmission device according to claim 1, wherein the first driver is further configured to generate the plurality of signals having different voltage levels.

3. The transmission device according to claim 1, wherein the first driver and the second driver are further configured to generate the plurality of signals having different voltage levels based on a current driving operation.

4. The transmission device according to claim 1, wherein the circuitry is further configured to receive the plurality of signals having different voltage levels from the communication line at different timings.

5. The transmission device according to claim 4, wherein the circuitry is further configured to transmit a set of signals of the plurality of signals having different voltage levels to a subsequent stage via the communication line.

6. A transmission method, comprising:
generating, by a first driver, a first signal of a plurality of signals, wherein the first signal has a first voltage level;
generating, by a second driver, a second signal of the plurality of signals, wherein the second signal has a second voltage level;
determining, by circuitry, based on a third voltage level at a point on a communication line when a current is drawn from the communication line, whether the communication line is connected to a receiving device, wherein the point is toward a cable on the communication line;
controlling, by the circuitry, a third driver to change a threshold voltage of a comparator connected to the third driver, wherein the change of the threshold voltage of the comparator is based on
the determination that the communication line is connected to the receiving device, and
the second voltage level of the second signal generated by the second driver; and
outputting, based on the determination that the communication line is connected to the receiving device, the plurality of signals having different voltage levels to the communication line at different timings.

7. A receiving device, comprising:
a controller;
a first comparator having a first threshold voltage corresponding to a plurality of signals having different voltage levels; and
a second comparator having a second threshold voltage corresponding to the plurality of signals having different voltage levels, wherein
the first comparator and the second comparator are configured to receive the plurality of signals having different voltage levels from a communication line at different timings,
the first comparator is configured to:
select a first signal having a first voltage level from the plurality of signals based on the first threshold voltage,
convert the first voltage level of the first signal to a second voltage level, and
transmit the first signal having the second voltage level to a sink device, and
the second comparator is configured to:
select a second signal having a third voltage level from the plurality of signals based on the second threshold voltage, and
transmit the selected second signal to the controller.

8. A receiving method, comprising
receiving, by a first comparator and a second comparator, a plurality of signals having different voltage levels from a communication line at different timings, wherein
the first comparator has a first threshold voltage corresponding to the plurality of signals having different voltage levels, and the second comparator has a second threshold voltage corresponding to the plurality of signals having different voltage levels;

selecting, by the first comparator, a first signal having a first voltage level from the plurality of signals based on the first threshold voltage;

converting, by the first comparator, the first voltage level of the first signal to a second voltage level;

transmitting, by the first comparator, the first signal having the second voltage level to a sink device;

selecting, by the second comparator, a second signal having a third voltage level from the plurality of signals based on the second threshold voltage; and transmitting, by the second comparator, the selected second signal to a controller.

9. The transmission device according to claim 1, wherein the circuitry is further configured to:

detect whether the communication line is connected to the transmission device; and open a switch in a power supply line based on the detection.

* * * * *